March 20, 1962  O. W. JACOBS  3,025,731
TRANSFER APPARATUS
Filed Nov. 21, 1957  15 Sheets-Sheet 1
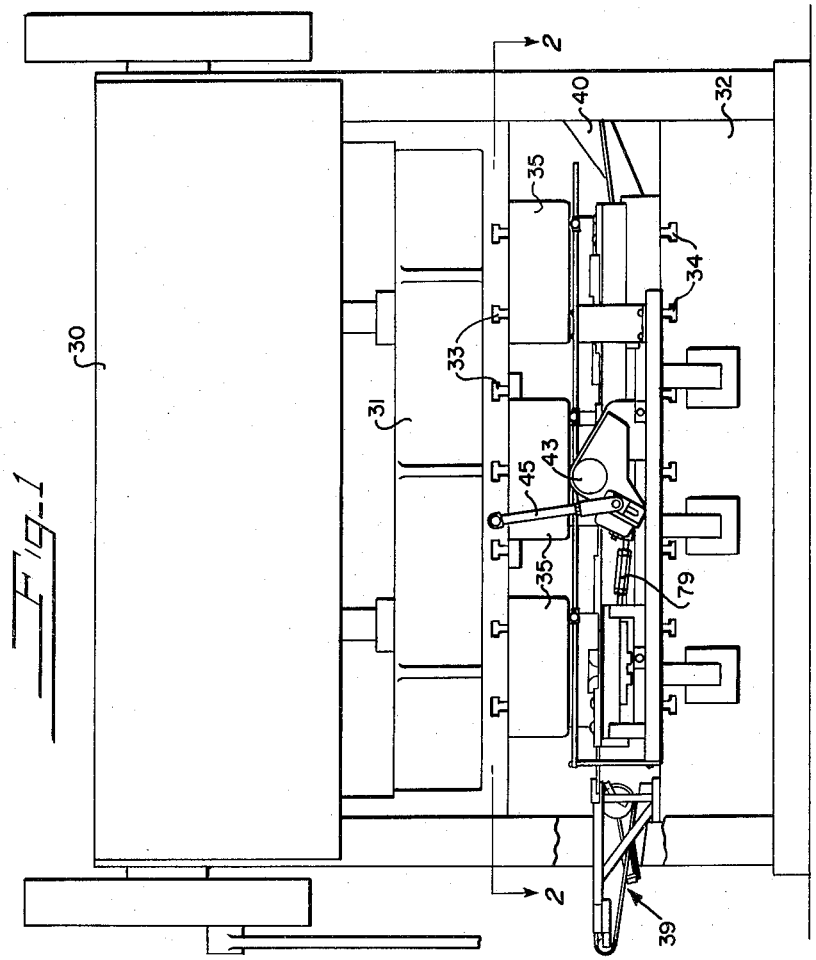
INVENTOR.
ORVILLE W. JACOBS
BY
DES JARDINS, ROBINSON, TRITLE & SCHENK
by Edward M. Tritle
HIS ATTORNEYS

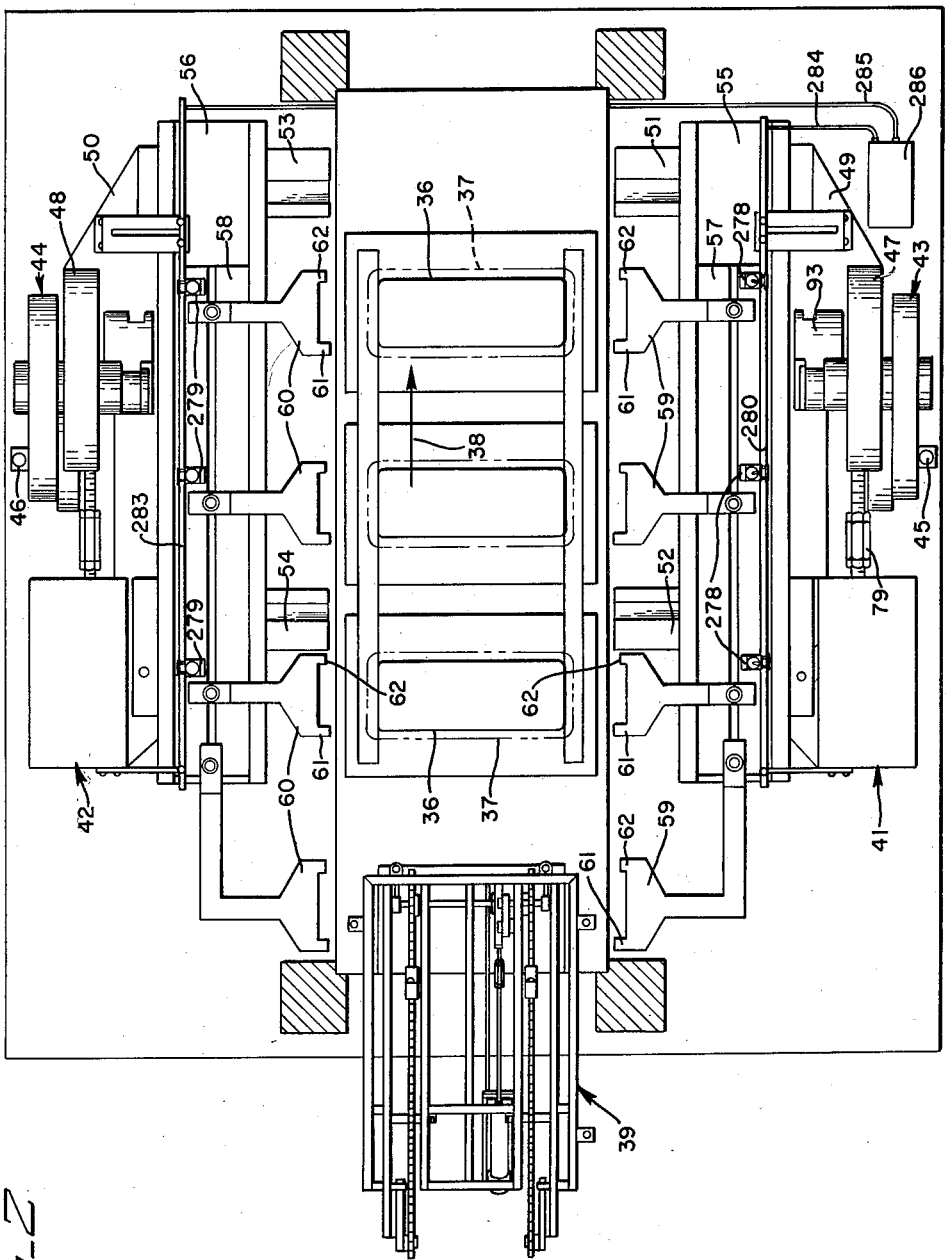

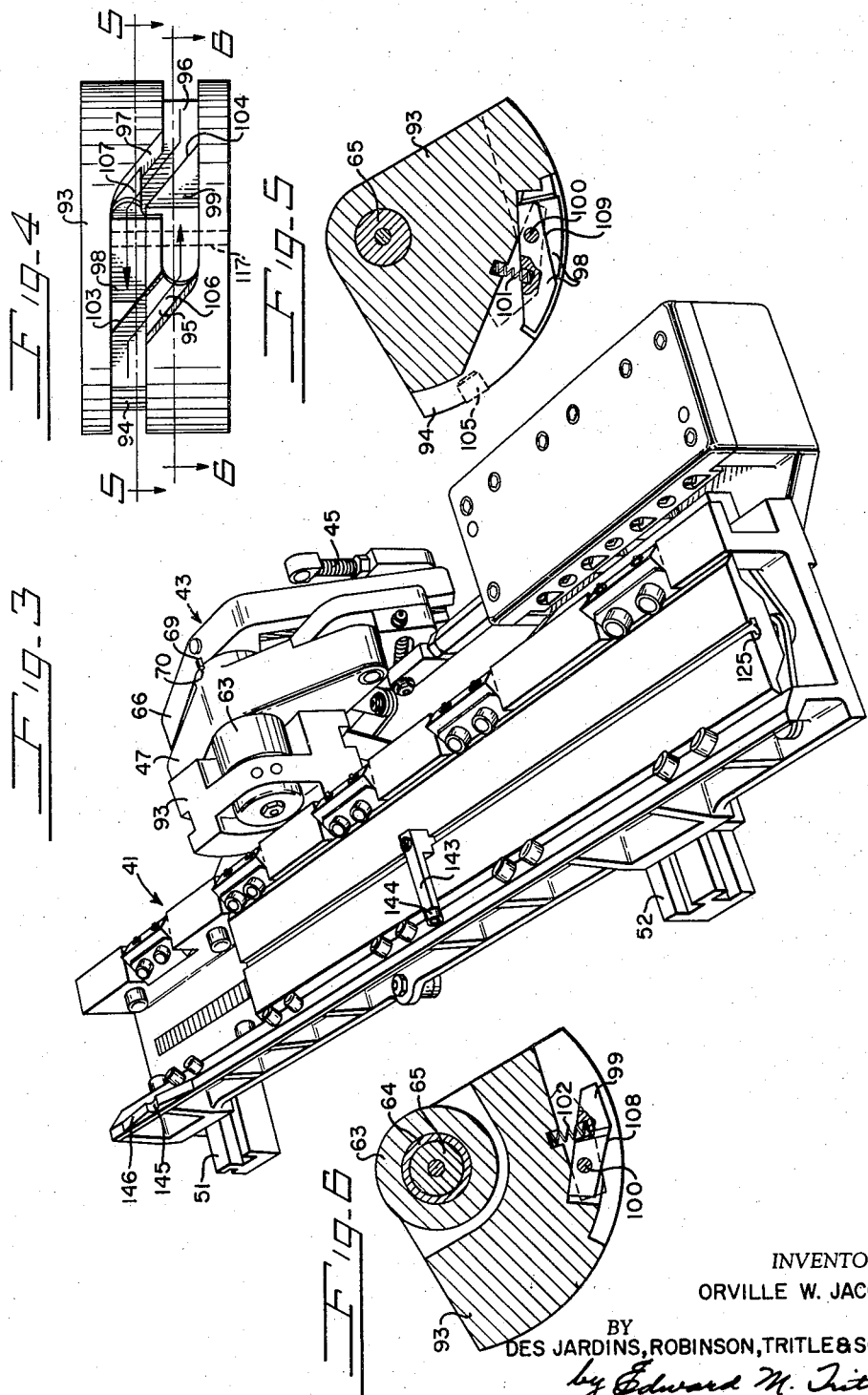

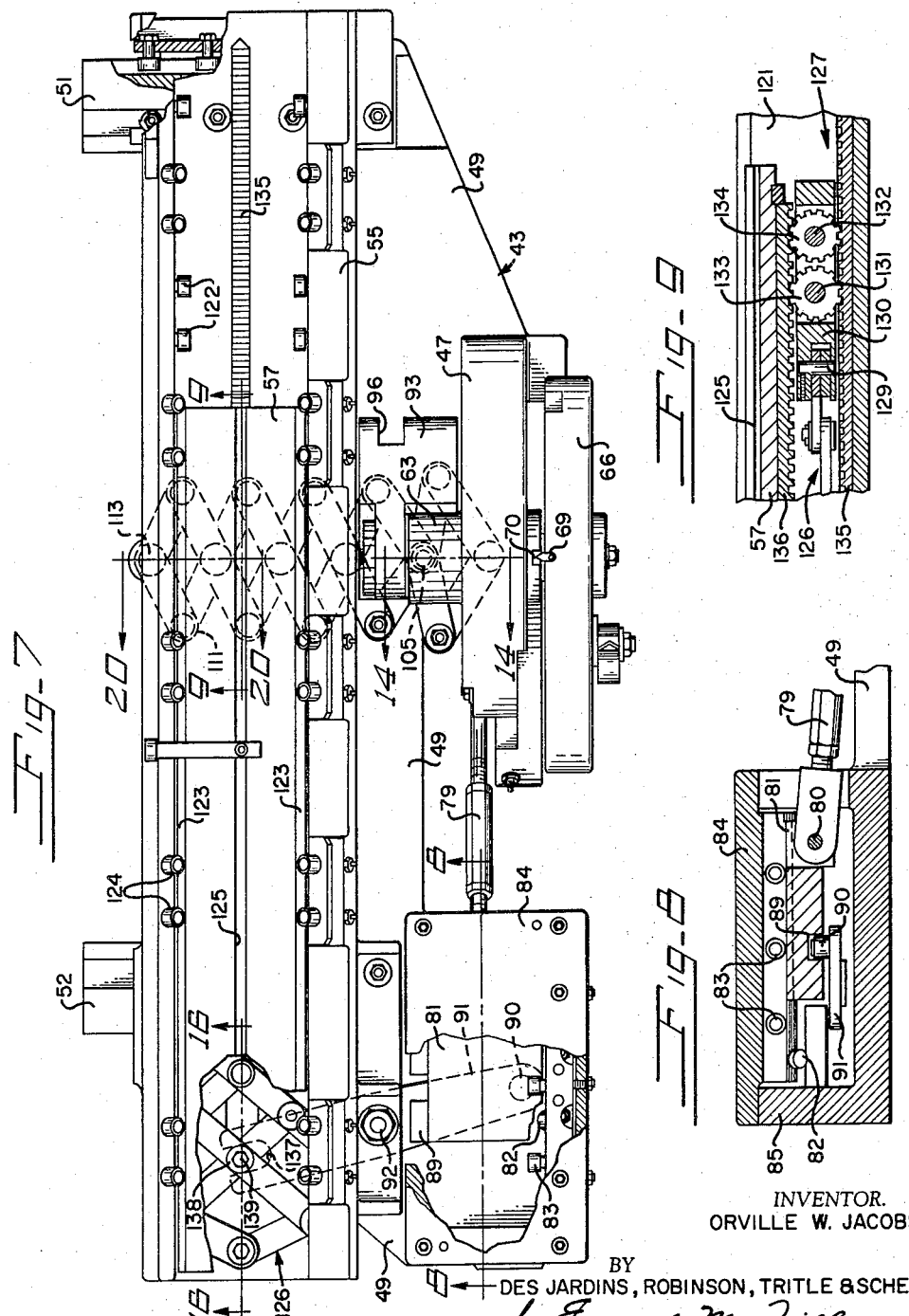

March 20, 1962  O. W. JACOBS  3,025,731
TRANSFER APPARATUS
Filed Nov. 21, 1957  15 Sheets-Sheet 5
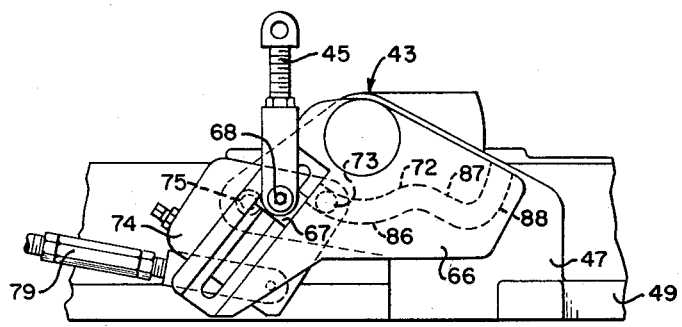
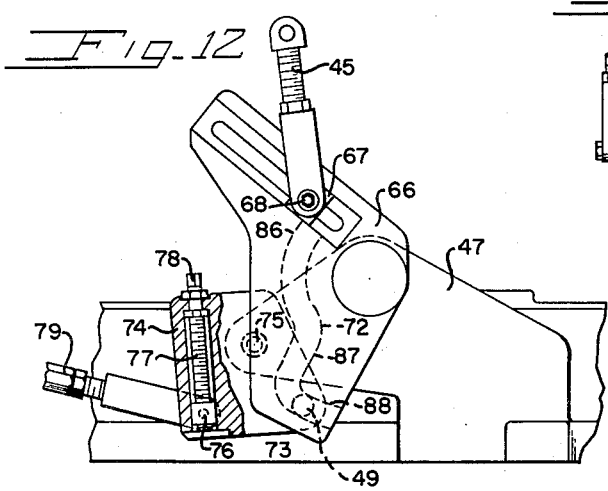
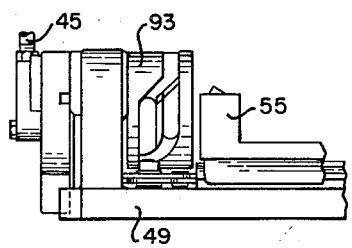
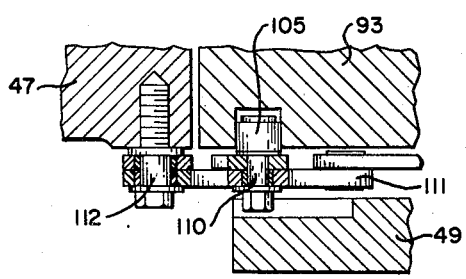
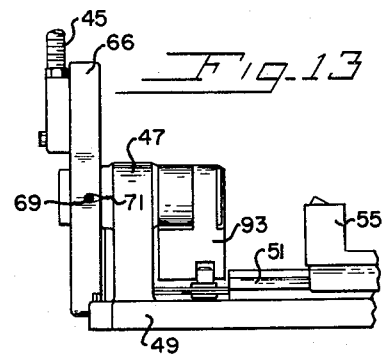
INVENTOR.
ORVILLE W. JACOBS
BY
DES JARDINS, ROBINSON, TRITLE & SCHENK
by Edward M. Tritle
HIS ATTORNEYS

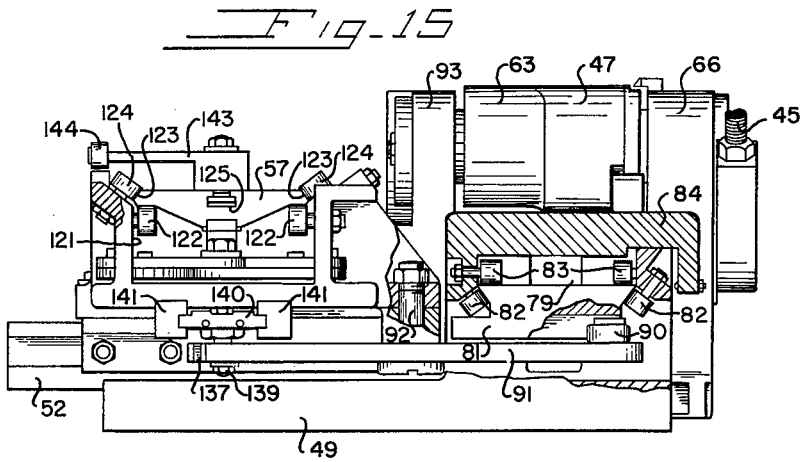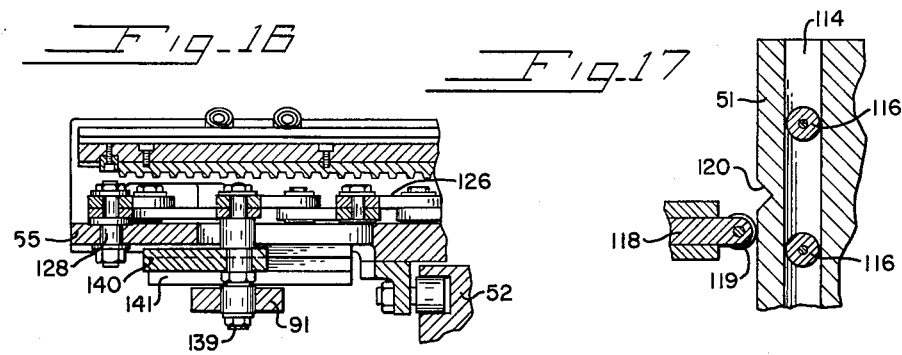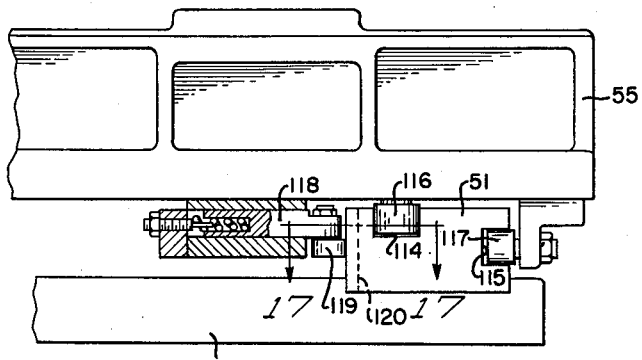

March 20, 1962 O. W. JACOBS 3,025,731
TRANSFER APPARATUS
Filed Nov. 21, 1957 15 Sheets-Sheet 7

INVENTOR.
ORVILLE W. JACOBS
BY
DES JARDINS, ROBINSON, TRITLE & SCHENK
by Edward M. Tritle
HIS ATTORNEYS

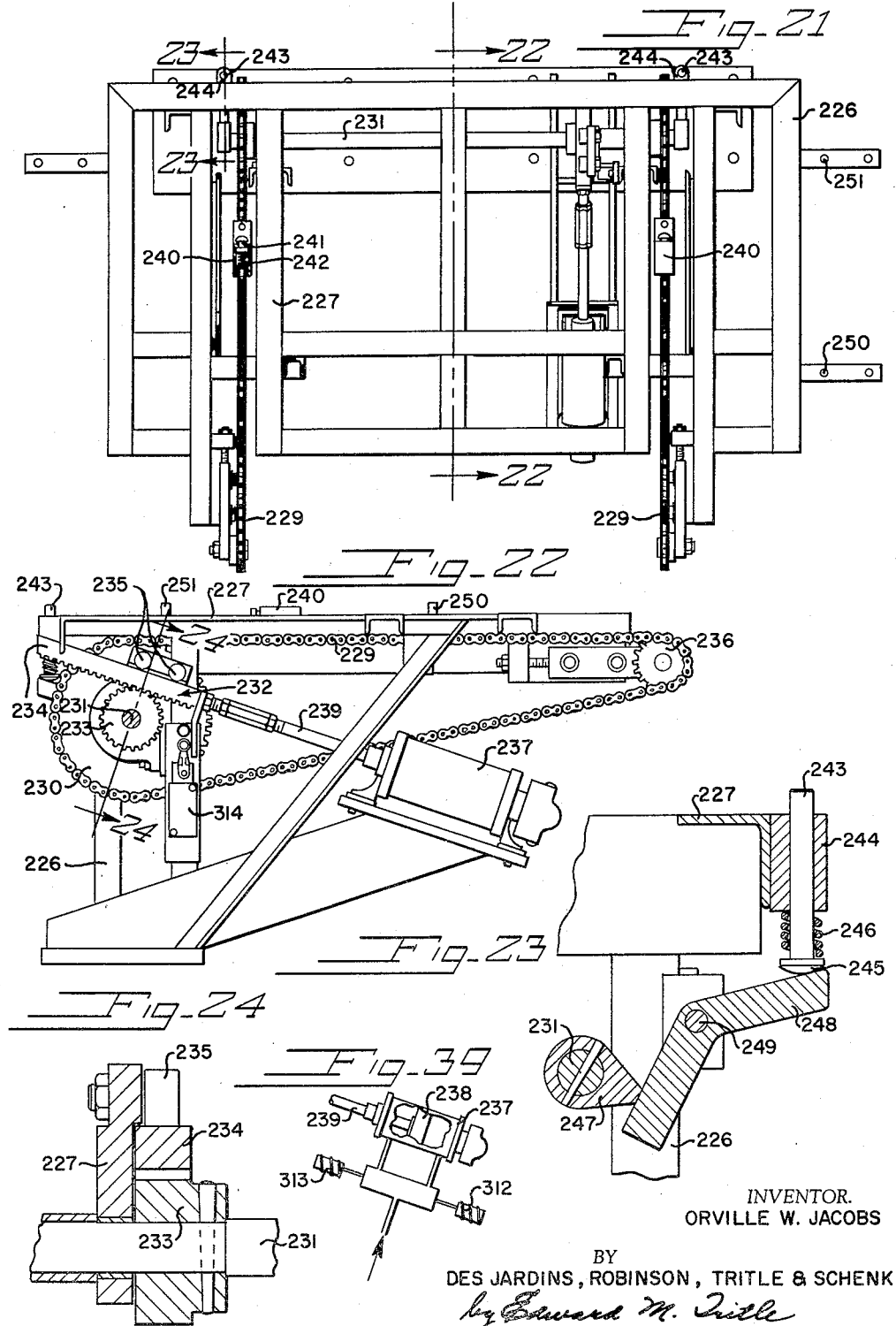

March 20, 1962
O. W. JACOBS
3,025,731
TRANSFER APPARATUS
Filed Nov. 21, 1957
15 Sheets-Sheet 9
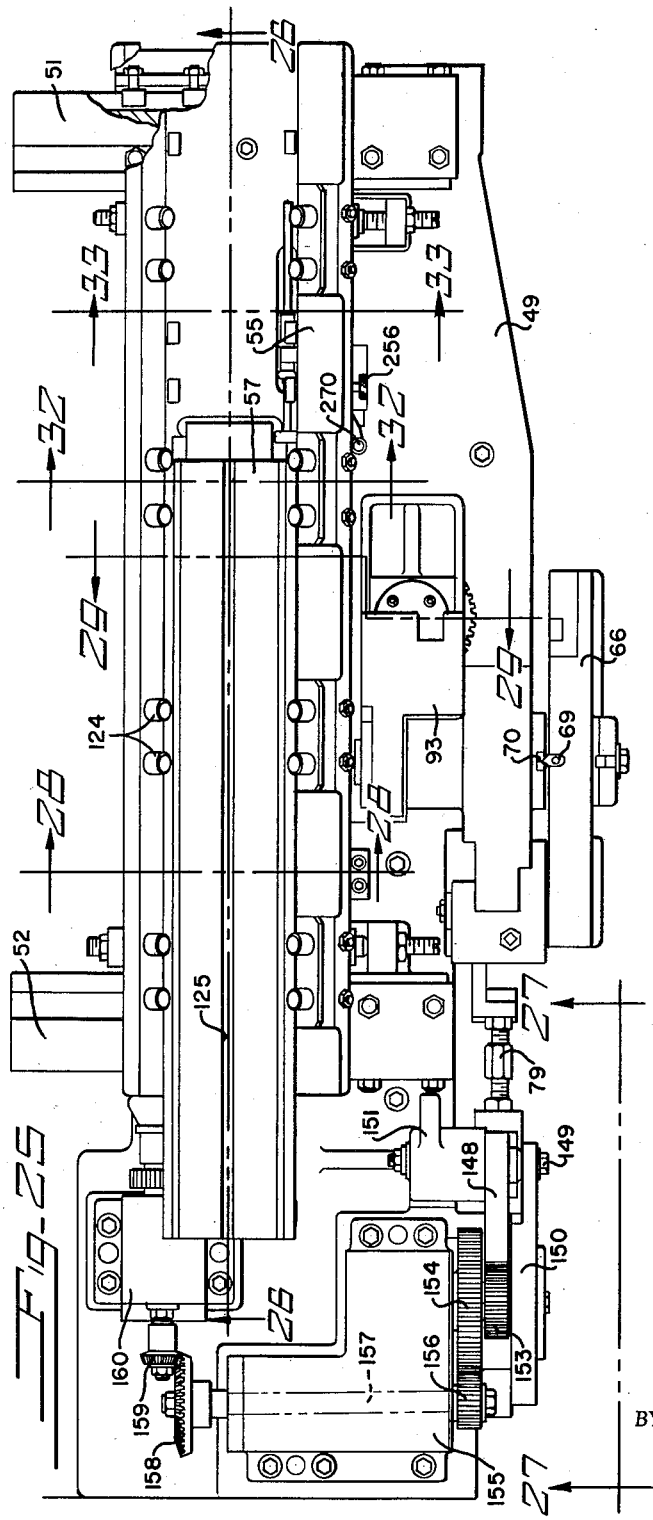
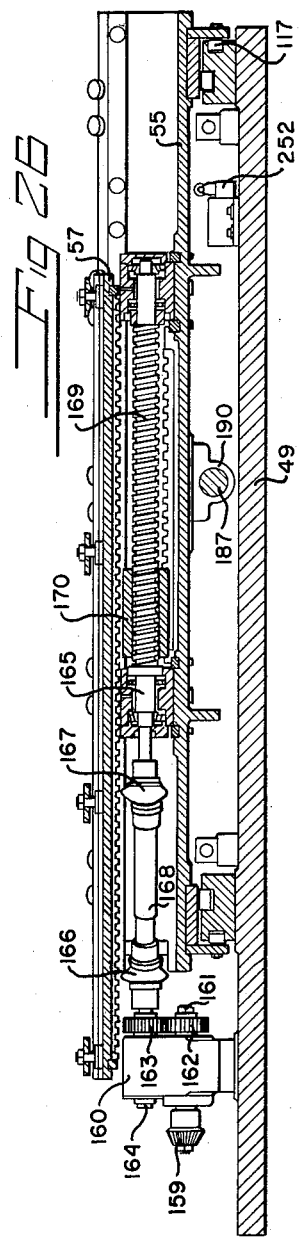
INVENTOR.
ORVILLE W. JACOBS
BY DES JARDINS, ROBINSON,
TRITLE & SCHENK
HIS ATTORNEYS

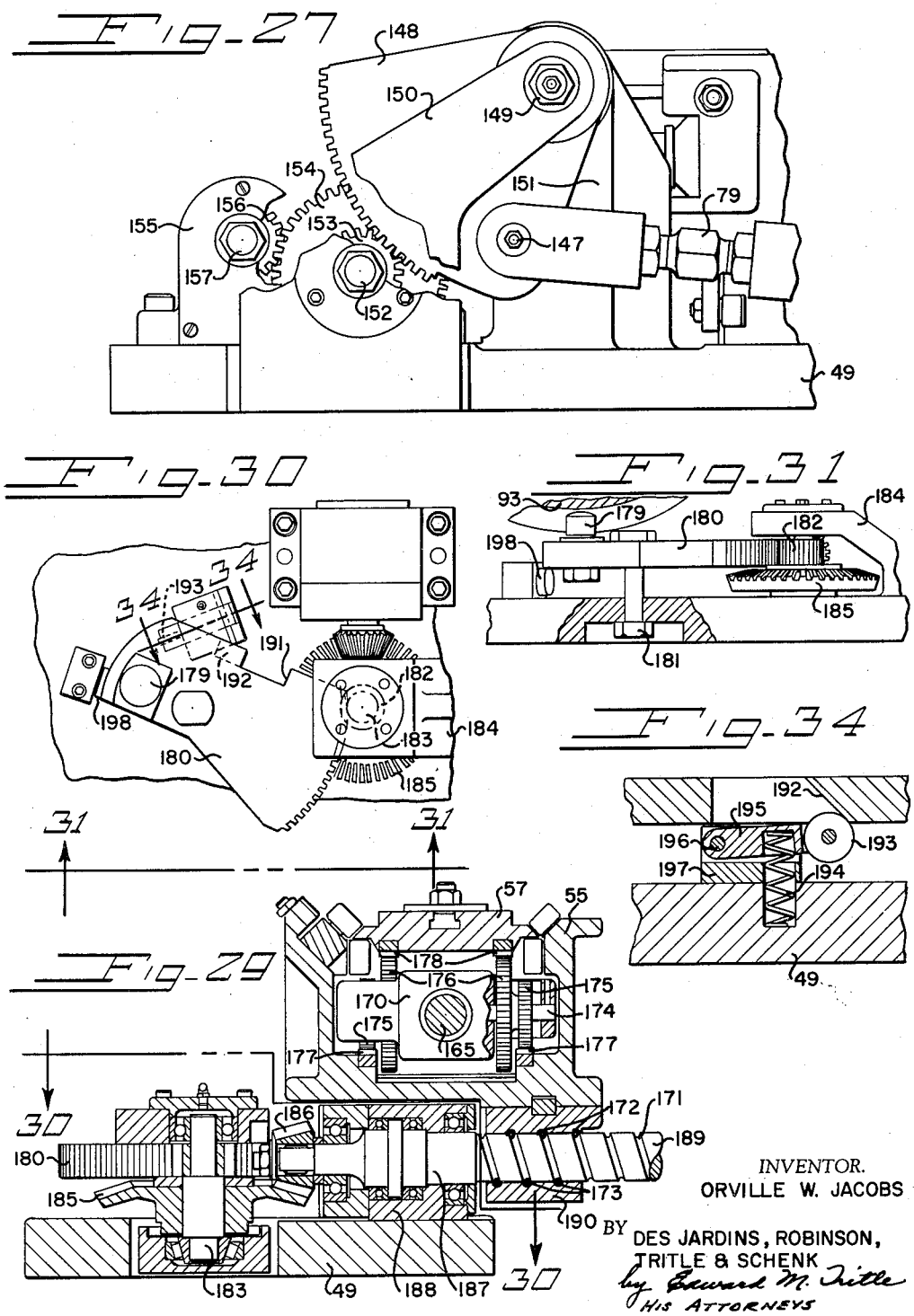

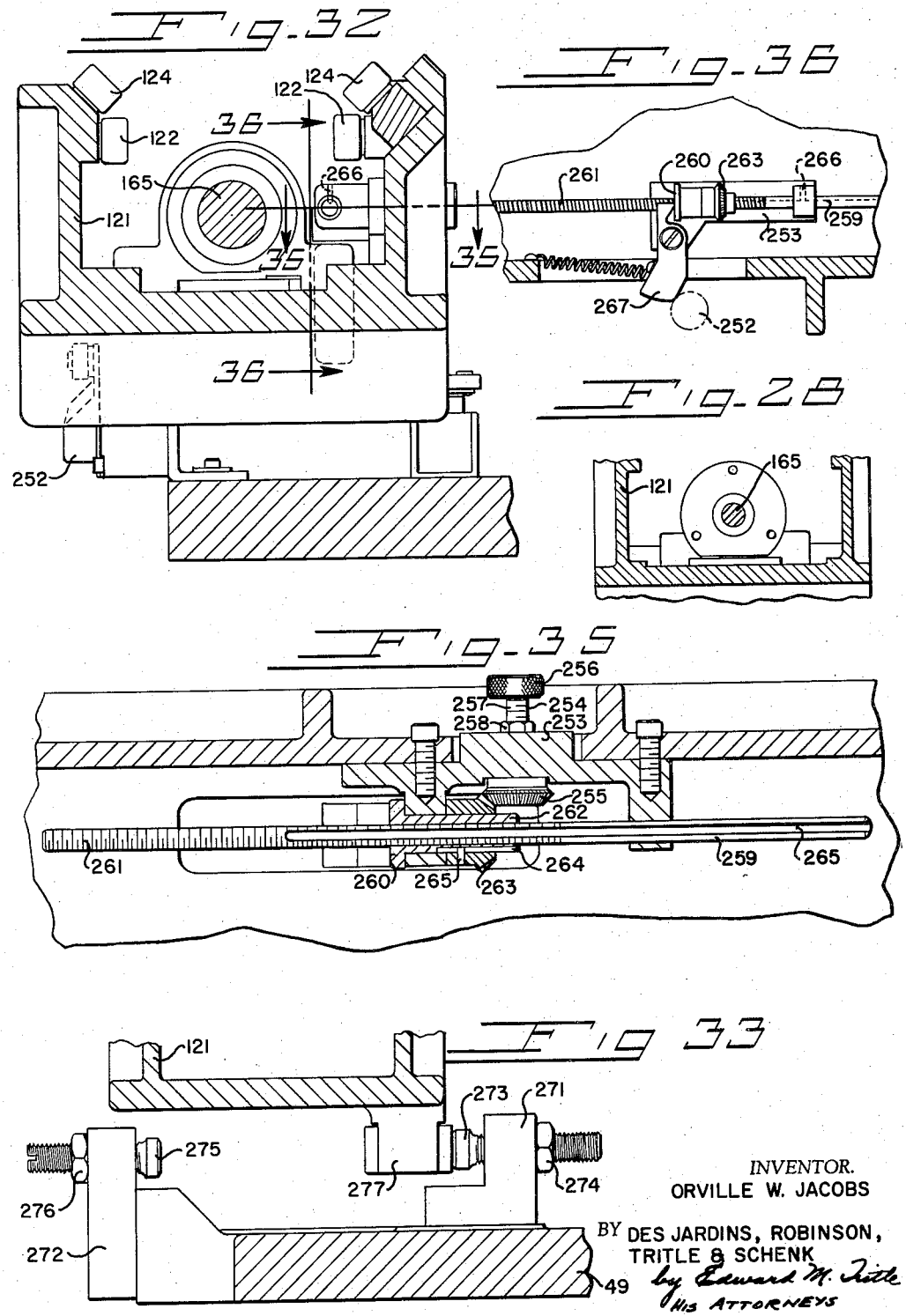

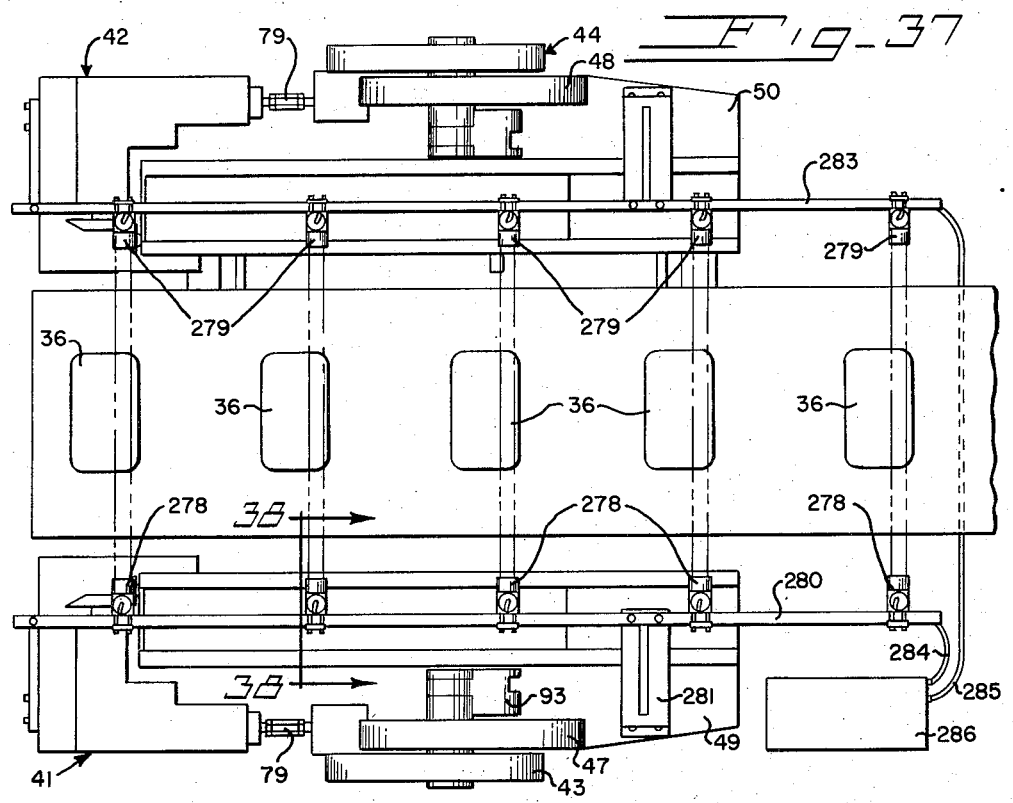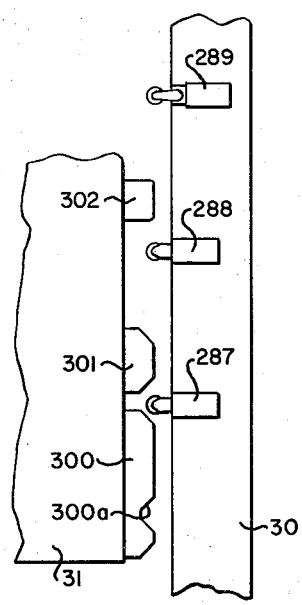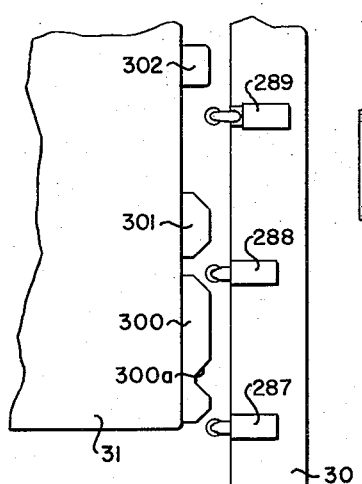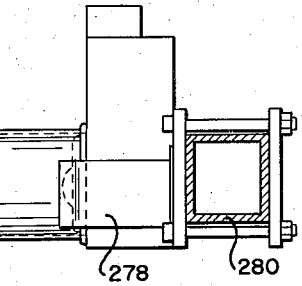

March 20, 1962  O. W. JACOBS  3,025,731
TRANSFER APPARATUS
Filed Nov. 21, 1957  15 Sheets-Sheet 13

INVENTOR.
ORVILLE W. JACOBS
BY
DES JARDINS, ROBINSON, TRITLE & SCHENK
Edward M. Tritle
HIS ATTORNEYS March 20, 1962
O. W. JACOBS
3,025,731
TRANSFER APPARATUS
Filed Nov. 21, 1957
15 Sheets-Sheet 14
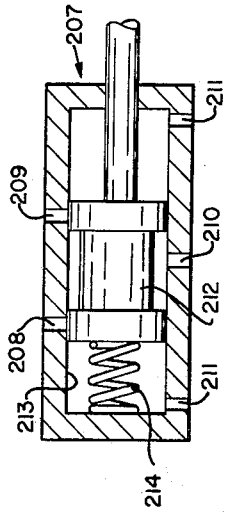
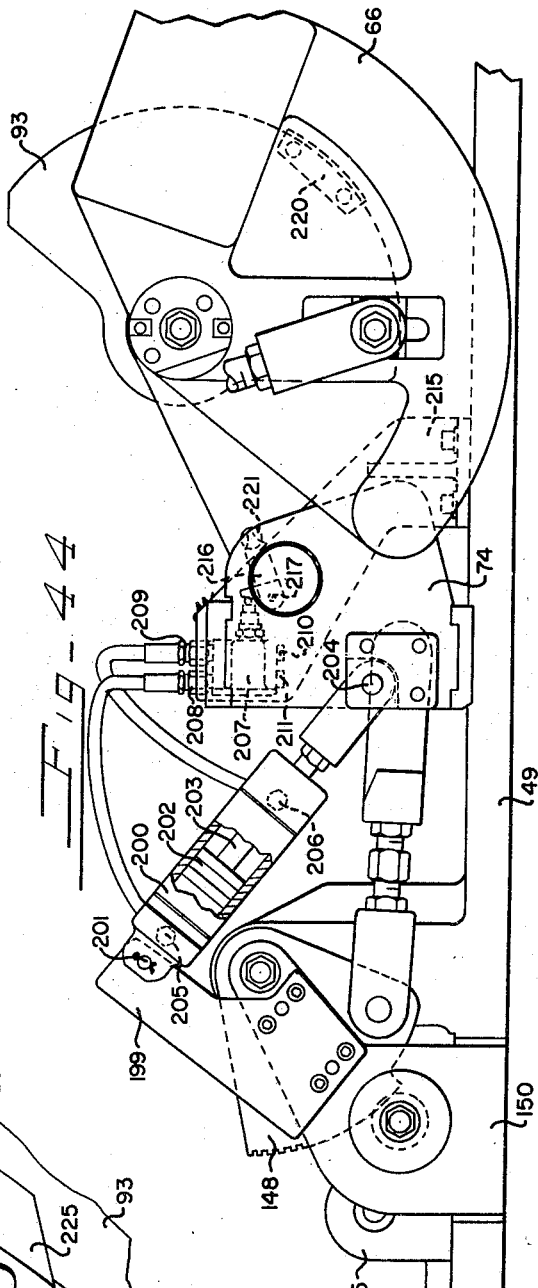
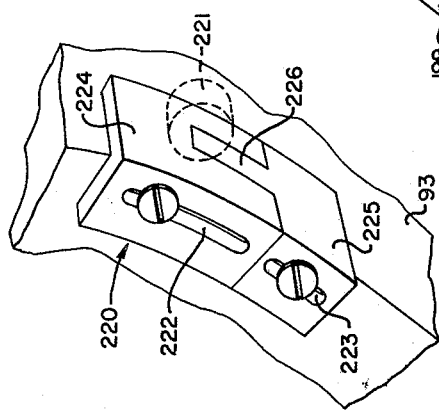
INVENTOR.
ORVILLE W. JACOBS
BY
DES JARDINS, ROBINSON, TRITLE & SCHENK
Edward M. Tritle
HIS ATTORNEYS

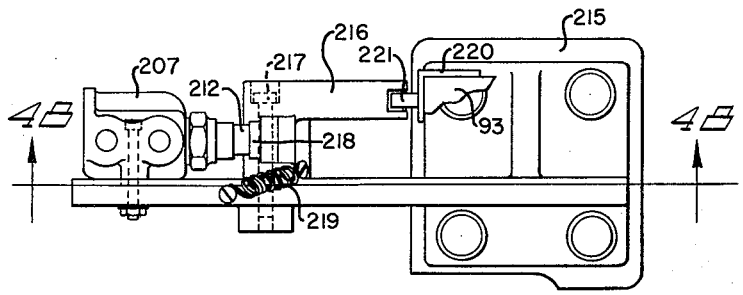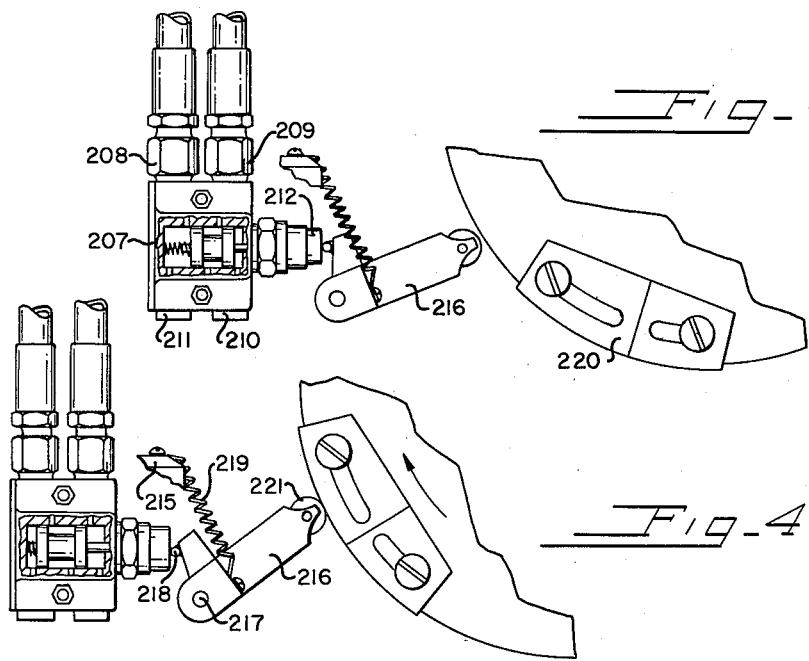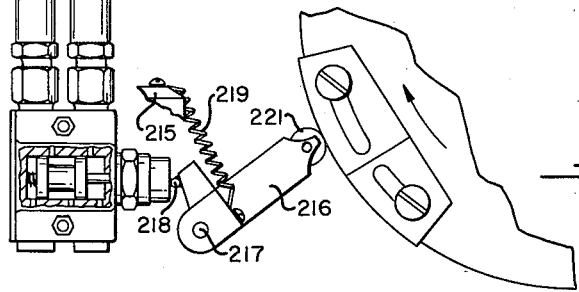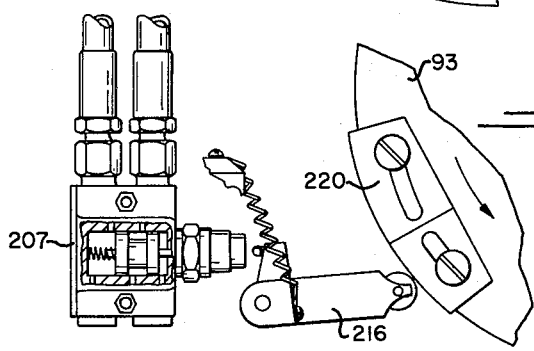

United States Patent Office 3,025,731
Patented Mar. 20, 1962

3,025,731
TRANSFER APPARATUS
Orville W. Jacobs, Dayton, Ohio, assignor to The Sheffield Corporation, Dayton, Ohio, a corporation of Delaware
Filed Nov. 21, 1957, Ser. No. 698,001
25 Claims. (Cl. 78—96)

This invention relates to material handling equipment and, more particularly, to an improved device for individually transferring one or more articles from one position of a series of positions to the next succeeding position thereof in a step-by-step manner. This application is a continuation-in-part of my co-pending application, Serial No. 532,417, filed September 6, 1955, now abandoned and assigned to the assignee of the present application.

One example of a commercial application of the device is in connection with presses in which a series of dies are employed to fabricate metal in a plurality of successive working stages. In such case, it is necessary to move the articles being so worked from one die station to a next adjacent die station on each stroke of the press. When the work pieces are large and the material being formed is heavy, it becomes necessary to handle each work piece individually rather than as a part of a continuous strip of material, as is done in the cut-and-carry method. Presently known transfer and loading mechanisms for accomplishing the automatic advance of individual work pieces from one station to a next adjacent station are of complicated construction and are not readily adapted to be shifted from one press to another as the need therefor arises.

Accordingly, it is an object of the present invention to provide an improved and simplified material handling device for moving individual articles from one of a series of positions to a next succeeding position thereof in a step-by-step manner.

Another object of the invention is to provide a transfer device adapted to move individual work pieces from one die station of a press to a next succeeding station thereof on each stroke of the press.

Another object of the invention is to provide a transfer mechanism for presses which is adapted to be synchronized with movements of the ram of the press.

Another object of the invention is to provide a loading and transfer mechanism for presses which is constructed as an attachment thereto so that it may be used to convert any standard type of press into an automatic transfer press.

Another object of the invention is to provide a transfer mechanism for presses which comprises independent units adapted to be mounted on the bed of the press on opposite sides of the die stations, to thereby provide an automatic material feeding and transfer apparatus.

Another object of the invention is to provide a press transfer mechanism which is adapted to be directly connected with the ram of the press for actuation thereby.

Another object of the invention is to provide a transfer and feeding mechanism for presses which is adapted to be synchronized with movements of the ram of the press and which incorporates a multiplying linkage for providing the extent of movement necessary to transfer an article from one work station to a next adjacent work station.

Another object of the invention is to provide a transfer mechanism for presses which is adapted to be synchronized with movements of the ram of the press and which is adaptable for use with presses having different lengths of stroke.

Another object of the invention is to provide a transfer mechanism for presses which is capable of moving a plurality of articles from each of a plurality of work stations to the next succeeding work station so as to permit the working of more than one article at a time at the work stations.

Another object is to provide novel supplementary drive means for effecting rapid acceleration of certain elements and at the same time minimizing large forces resulting from such rapid acceleration.

Another object is in the provision of an automatic loading device for presses in which loader movements are properly synchronized with movements of the press to prevent damage to the loader, press, or work pieces.

Another object of the invention is to provide an automatic feeding and transfer unit of novel construction and design in which safety features are included to prevent damage to the unit or the work pieces if, for any reason, a work piece becomes improperly positioned to receive the next working stroke of the ram of a press or if the various movements of the feeding and transfer mechanism are improperly coordinated with related movements of the press components.

With these and other objects in view which will become apparent from the following description, the invention includes certain novel features of construction and combination of parts, the essential elements of which are set forth in the appended claims, and a preferred form or embodiment of the invention will hereinafter be described with reference to the accompanying drawings in which:

FIG. 1 is a front elevation of a press to which the feeding and transfer mechanism constituting the present invention is shown applied.

FIG. 2 is a cross-sectional plan view taken along the line 2—2 in FIG. 1, with the ram in its raised position.

FIG. 3 is a perspective view of one of the transfer units shown in FIG. 2.

FIG. 4 is a bottom view of a cam which effects engagement of the jaws with articles to be transferred.

FIG. 5 is a cross-sectional view taken along the line 5—5 in FIG. 4.

FIG. 6 is a cross-sectional view taken along the line 6—6 in FIG. 4.

FIG. 7 is a plan view of one of the transfer units in accordance with one embodiment of the invention with parts broken away to show the interior construction of the same.

FIG. 8 is a cross-sectional view taken along the line 8—8 in FIG. 7.

FIG. 9 is a cross-sectional view taken along the line 9—9 in FIG. 7.

FIG. 10 is fragmentary view showing the cyclically operable actuator for the transfer units.

FIG. 11 is an end view of the device shown in FIG. 10.

FIG. 12 is a view similar to FIG. 10 but showing the device in a moved position.

FIG. 13 is an end view of the device shown in FIG. 12.

FIG. 14 is a cross-sectional view taken along the line 14—14 in FIG. 7.

FIG. 15 is a left end view of the transfer device shown in FIG. 7, with parts broken away to show the internal construction of the device.

FIG. 16 is a cross-sectional view taken along the line 16—16 in FIG. 7.

FIG. 17 is a cross-sectional view taken along the line 17—17 in FIG. 18.

FIG. 18 is a front elevation of the right-hand end of the transfer unit shown in FIG. 7 to illustrate a particular feature of the construction.

FIG. 21 is a plan view similar to FIG. 2 and enlarged to illustrate the feeding or loading mechanism thereof.

FIG. 22 is a cross-sectional view of the feeder or loading mechanism taken along the line 22—22 in FIG. 21.

FIG. 23 is a cross-sectional view taken along the line 23—23 in FIG. 21 to illustrate a particular feature of the feeding or loading mechanism.

FIG. 24 is a cross-sectional view taken along the line 24—24 in FIG. 22 to illustrate a particular feature of the feeding or loader mechanism.

FIG. 25 is a plan view of one of the transfer units shown in FIG. 2 in accordance with another embodiment of the invention.

FIG. 26 is a cross-sectional view of one of the transfer units and taken along the line 26—26 of FIG. 25 to show the interior construction of the same.

FIG. 27 is a partial cross-sectional view of the transfer unit and taken along the line 27—27 in FIG. 25.

FIG. 28 is a partial cross-sectional view of the transfer unit and taken along line 28—28 in FIG. 25.

FIG. 29 is a partial cross-sectional view of one of the transfer units with parts broken away to show the interior construction of the same and taken along the broken line 29—29 in FIG. 25.

FIG. 30 is a cross-sectional view taken along the broken line 30—30 in FIG. 29.

FIG. 31 is a cross-sectional view taken along the line 31—31 in FIG. 30.

FIG. 32 is a partial cross-sectional view taken along the line 32—32 in FIG. 25.

FIG. 33 is a partial cross-sectional view taken along the line 33—33 in FIG. 25.

FIG. 34 is a cross-sectional view with parts broken away to show one of the features of construction and taken along the line 34—34 in FIG. 30.

FIG. 35 is a partial cross-sectional view with parts broken away and taken along the line 35—35 in FIG. 32.

FIG. 36 is a partial cross-sectional view with parts broken away and taken along the line 36—36 in FIG. 32.

FIG. 37 is a plan view similar to a portion of FIG. 2 and enlarged to illustrate safety features of the transfer mechanism.

FIG. 38 is a cross-sectional view taken along line 38—38 in FIG. 37.

FIG. 39 is a diagrammatic view with parts broken away to illustrate the actuator portion of the feeding or loading mechanism of FIG. 22.

FIG. 40 is a view of the ram of the press in its lowermost position to illustrate safety features of the invention.

FIG. 41 is a view similar to FIG. 40 but with the ram of the press in its fully raised position.

FIG. 44 is an elevation view of the supplemental drive means with certain parts broken away in the interests of clarity.

FIG. 45 is a view illustrating a portion of the sequential timing means for the supplementary drive means.

FIG. 46 is a detailed view illustrating control means for the supplementary drive means.

FIG. 47 is a plan view of a portion of the arrangement shown in FIG. 44 with certain parts omitted in the interest of clarity.

FIG. 48 is a view taken along line 48—48 in FIG. 47 and illustrating the relationship of the control means and control arm for a particular position of the sequential and timing means.

FIG. 49 is a view taken along line 48—48 in FIG. 47 and illustrating the relationship of the control means and control arm for another position of the sequential and timing means.

FIG. 50 is a view taken along line 48—48 in FIG. 47 and illustrating the relationship of the control means and control arm for still another position of the sequential and timing means.

Figure 19:
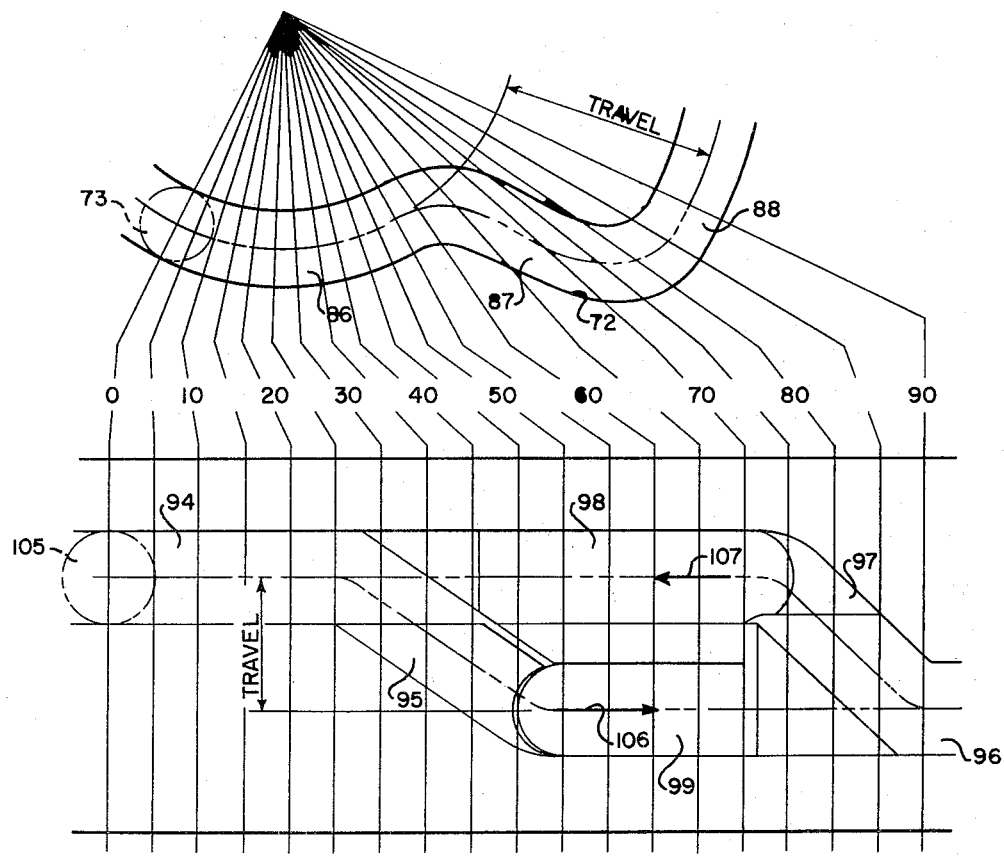
FIG. 19 is a coordinated timing chart of the two cams which form a part of the cyclically operable actuator for the unit.
Figure 20:
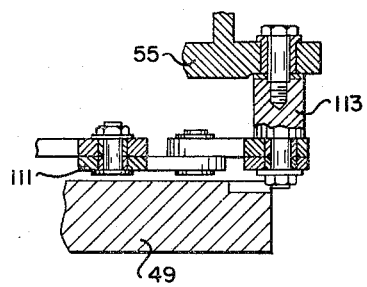
FIG. 20 is a cross-sectional view taken along the line 20—20 in FIG. 7.

The invention forming the subject matter of the present application will hereinafter be shown and described in connection with a feeding and transfer mechanism for presses, wherein the articles being worked are advanced to a die station, or from a die station, or from one die station to the next so as to form or fabricate the articles in a progressive manner as they move through the press.

The transfer mechanism as herein shown and described for purposes of illustration comprises two similar unit sections for detachable mounting on the press bed, one on each side of the dies which form or operate on the metal blank. Each unit section includes a device for rapidly transversing the part along the press and means for gripping the part prior to a traverse stroke. Each of these unit sections is similarly connected to the ram or press slide to be powered from the slide and in timed relation herewith. The stroke of the transfer mechanism is readily adjustable so that the mechanism can be used with existing presses of different strokes while obtaining a desired length of traverse movement.

With a unitary arrangement such as this, adapted to be conveniently connected to and disconnected from the press bed of any existing press and coupled to the press slide or ram, it will be obvious that it is unnecessary to build an entire press with a built-in transfer mechanism. In accordance with the present invention, the transfer mechanism being a self-contained unit can be applied to existing presses in a very convenient manner and may be used to convert existing presses to automatic operation.

In FIG. 1 is shown a press 30 of conventional design and which includes a slide or ram 31 which is adapted to be raised and lowered in a usual manner on each operation of the press. The press is also provided with a bed 32 which forms a part of the stationary framework of the press. The ram and bed are shown provided with T-slots 33 and 34, respectively, by which a punch holder and/or punches 35, and a die shoe and/or die blocks 36 may be adjustably secured to the ram and bed, respectively. In FIG. 1, the ram 31 is shown in its lowered position with punches 35 fully engaged with their associated die blocks 36 (see FIG. 2). The work pieces 37 are indicated in dot-dash outline and are not visible in FIG. 1. When ram 31 is raised to disengage the punches from the dies, the work pieces 37 will be elevated by suitable spring pads so as to be clear of the dies and punches, so that they may be moved by the transfer mechanism to the next succeeding work station. In FIGS. 1 and 2, the movement of the work piece is from left to right as indicated by the arrow 38 in FIG. 2. The work pieces are pre-cut sheet metal and are advanced to the first of said die stations by a feeding or loading mechanism, indicated generally at 39, and described more particularly hereinafter. The finished articles are discharged from the right-hand end of the press by a chute 40, to which they are delivered by the transfer mechanism.

In general, the transfer mechanism which cooperates with the dies to bring about automatic production of finished work pieces by press 30 comprises a transfer unit which is adapted to be mounted on the bed of the press at one side of the dies. Preferably, although not necessarily, the transfer units are provided in pairs, as at 41 and 42 on opposite sides of the press. As indicated in FIG. 2, the transfer units are complementary to one another so that both produce movement in the same direction despite their location on opposite sides of the dies. Otherwise, the units are of identical construction and, for the purposes of this description, unit 41 only will be described in detail. As shown in FIG. 2, both units 41 and 42 are provided with cyclically operable actuators 43 and 44 respectively, each of which is connected with the ram 31 of the press by connecting rods 45 and 46, respectively. Actuators 43 and 44 are journaled in upstanding brackets 47 and 48, respectively, formed integrally with base plates 49 and 50, respectively, which constitute the major frame elements of the transfer units. On each base plate is mounted a pair of carriage guide rails 51 and 52, and 53 and 54, on which carriages 55 and 56 are mounted for movement in a fore and aft direction. Mounted on carriages 55 and 56 are slides 57 and 58, respectively, which slides are supported on their respective carriages for sliding movement in a direction at right angles to the movement of the carriages along their respective guide rails. Each slide 57 and 58 has mounted thereon a plurality of work engaging jaws 59 and 60, respectively, each having fingers 61 and 62 thereon adapted to engage work pieces 37 and move the work pieces in the direction of arrow 38 along the bed of the press during each operating cycle of ram 31. While in the example shown, only one punch and die combination is shown at each of the three die stations herein illustrated, it will be readily understood that, if desired, a plurality of similar punches and dies may be provided at each of the die stations together with an equal number of work engaging jaws 59 and 60 so as to enable a plurality of work pieces to be fabricated at each die station in place of the single pieces 37 shown in FIGURE 2.

Transfer units 41 and 42 are so constructed that, as ram 31 rises and work pieces 37 are elevated from the dies by well-known spring ejection pads (not shown), carriages 55 and 56 are advanced inwardly toward the dies thus causing jaws 59 and 60 to engage work pieces 37. When the work pieces have been fully elevated so as to lie flush with the top surfaces of the dies and jaws 59 and 60 have advanced inwardly and been fully engaged with the workpieces, slides 57 and 58 are then simultaneously shifted to the right, as viewed in FIGURE 2, to move each work piece from one die station to the next adjacent die station after which jaws 59 and 60 are retracted by outward movement of carriages 55 and 56 at the beginning of the down-stroke of ram 31. During continued downward movement of the ram, jaws 59 and 60 continue to move away from the work pieces and slides 57 and 58 are at the same time shifted to the left, as viewed in FIG. 2, to restore the transfer mechanism to its original starting position as shown in FIG. 2. The above-mentioned movements of the carriages and slides are effected by cyclically operable actuators 43 and 44 (FIG. 2) which are driven by ram 31 and connecting rods 45 and 46 respectively.

In FIGS. 3 to 20, inclusive, there is shown the detailed construction of transfer unit 41 which is mounted at the front of the press (see FIGS. 1 and 2). As best shown in FIGS. 3 and 7, upstanding bracket 47, which is formed integrally with, or secured to, base plate 49, has a boss 63 formed thereon which is bored to receive a bushing 64 (FIG. 6) in which is journaled a shaft 65. Secured to the forward end of shaft 65 is a cam arm 66 which is slotted to receive a crosshead 67 (see FIGS. 10 and 12), to which the lower end of connecting rod 45 is pivotally connected by bolt 68. The cyclically operable actuator 43, including shaft 65 and cam arm 66, is designed to be rocked through an angle of 90° on each reciprocation of ram 31. By suitable adjustment of crosshead 67 along the slot and on cam arm 66, the actuator can be caused to move through an angle of 90° regardless of the travel of ram 31 which may vary considerably with different types of presses. For adjustment and set-up purposes, cam arm 66 is provided with a small pointer 69 (FIG. 7) which is adapted to register with an index line 70 scribed on the forward end of boss 63 when the actuator is in its home position. A second index line 71 (FIG. 13) is scribed on the boss 90° from line 70 so as to afford a convenient means for determining when the actuator is receiving the proper throw. The operator can thereby adjust the position of crosshead 67 back and forth in the slot in arm 66 until 90° movement of the actuator is obtained.

Cam arm 66 is provided on its rear face with a cam groove 72 (FIGS. 10 and 12) which is adapted to receive a follower roll 73 supported on the forward face of a rocker plate 74 pivoted at 75 on bracket 47. Rocker plate 74 is slotted to receive a crosshead 76 (FIG. 12) which may be adjusted along the slot by a screw 77, which is threaded in the crosshead and projects from plate 74 where it is provided with a square shank 78 to receive a wrench by which the screw may be turned and the crosshead moved along the slot in the plate. The crosshead has pivotally connected thereto the right-hand end of a connecting rod 79 which, at its opposite end, is pivotally connected at 80 to a reciprocating carriage 81 (FIGS. 7, 8 and 15) which, best shown in FIG. 15, is supported for longitudinal sliding movement on inclined rolls 82 and horizontal retaining rolls 83. The rolls 82 and 83 are supported by the lid 84 of a box-like housing 85 formed on the left-hand end of base plate 46. Consequently, when the cam arm 66 is rocked from its initial position shown in FIG. 10, which it occupies when ram 31 is lowered, to its fully moved position (shown in FIG. 12) which it occupies when the ram is raised, rocker plate 74 will first remain stationary while follower roll 73 traverses the concentric portion 86 (FIGS. 10 and 19) of cam groove 72, after which it will be rocked clockwise as the roll traverses the non-concentric portion 87 of the groove. Thereafter, plate 74 will again remain stationary while the follower roll 73 rides in the concentric portion 88 of groove 72 as shown in FIG. 12. As ram 31 descends, the rocker plate 74 will be rotated counter clockwise about its pivot 75 during the time that roll 73 traverses the portion 87 of groove 72. Hence, carriage 81 (FIGS. 7 and 8) will be reciprocated once for each cycle of operation of the actuator 43.

As shown in FIGS. 7, 8 and 15, carriage 81 is provided with a transverse groove 89 in which is received a follower roll 90 mounted on the forward end of lever 91. Lever 91 is pivoted on a bolt 92 carried by carriage 55 and causes slide 57 carried thereby to be reciprocated by mechanism hereinafter to be described, first to the right (as viewed in FIG. 7) and then to the left and to return it to its normal position (as shown in FIG. 7) each time carriage 81 is reciprocated by cam arm 66.

Actuator 43 also includes a drum cam 93 (FIGS. 3, 4, 5 and 6) secured to the rear end of actuator shaft 65 and serving to move carriage 55 inwardly and outwardly to engage and disengage jaws 59 and 60 (FIG. 2) with the work pieces. As shown in the plan view of cam 93, illustrated in FIG. 4, the peripheral face thereof is provided with a cam groove having a straight entry portion 94, an inclined jaw engaging portion 95, a straight exit portion 96, and an inclined jaw disengaging portion 97. As shown in FIGS. 4, 5 and 6, cam 93 is fitted with a pair of pivoted switches 98 and 99, journaled for rotation about a pin 100 whose axis is parallel to the axis of actuator shaft 65. Switches 98 and 99 are normally held in the positions shown in FIGS. 5 and 6 by compression springs 101 and 102, so as to hold their angular ends in elevated position. Thus, angular edge 103 of switch 98 forms one side of the inclined portion 95 of the cam groove, while angular edge 104 of switch 99 forms one side of the inclined portion 97 of the groove. A follower roll 105 (FIGS. 5 and 14) is thereby caused to follow the path of arrow 106 (FIG. 4) as cam 93 rocks clockwise upon elevation of ram 31, and is caused to follow the path of arrow 107 as the cam rocks counter clockwise upon downward movement of ram 31. Roll 105 follows the path of arrows 106 and 107 as just described due to the fact that, as the roll moves out of the inclined portion 95 of the groove (FIG. 4) during clockwise rotation of the cam, the upper end of the roll bears against the inclined face 108 (FIGS. 4 and 6) of switch 99 and depresses the angular end of the switch against the compression force of spring 102 to the position shown in dotted outline in FIG. 6. However, as soon as the roll clears the angular edge 104 of the switch, spring 102 returns the switch to the raised position shown in FIG. 6 whereby edge 104 will be operative to engage roll 105 as the cam is rocked counter clockwise upon downward movement of the ram 31. Hence, the roll will be guided through the inclined portion 97 of the groove upon return movement of the ram. The upper end of the roll thereafter engages inclined face 109 (FIGS. 4 and 5) of switch 98 and depresses the angular end of this switch against the force of spring 101 to the position shown in dotted outline in FIG. 5. After the roll rides over the end of the switch, spring 101 returns the angular end of the switch to its raised position so that it will again be in position to engage the roll and shunt it into the inclined portion 95 of the groove during the next cycle of operation of cam 93.

In the embodiment shown in FIGS. 7 and 14, the follower roll 105 is mounted on the upper end of a pivot bolt 110 for one pair of links of a lazy tongs linkage 111 (FIG. 7). The forward end of the lazy tongs linkage is connected to the underside of bracket 47 by a pivot bolt 112, while the rear end of the linkage is connected to carriage 55 by means of a pivot bolt 113 (see also FIG. 20). Therefore as roll 105 moves from the entry portion 94 of the groove in cam 93 to the exit portion 96 thereof, the lazy tongs linkage 111 is caused to be extended and carriage 55 moved inwardly along rails 51 and 52 to engage jaws 59 and 60 with the work pieces to be transferred. Likewise, as cam 93 is returned to its initial position, the lazy tongs linkage is caused to retract, thereby returning carriage 55 to the position shown in FIG. 7.

As noted heretofore, carriage 55 travels along rails 51 and 52 (FIG. 3), free movement of the carriage on the rails being provided by rolls mounting on the carriage which run in grooves provided in the rails. This construction is illustrated in FIG. 18 wherein rail 51 is shown mounted on the base plate 49 and provided with longitudinally extending grooves 114 and 115 which receive rolls 116 and 117, respectively, secured to the carriage frame. A similar construction is provided with respect to rail 52 (at the left in FIG. 2).

To locate and yieldably retain the carriage 55 in its advanced or innermost position, a spring-pressed plunger 118 (FIGS. 17 and 18) is mounted on the underside of the carriage and is provided with a roll 119 adapted to bear against the side of rail 51. Rail 51 is provided with a vertically extending detent or V-shaped groove 120 (FIGS. 17 and 18) located at the proper position along the rail to receive roll 119 when the carriage is in its fully extended position. Although not shown herein, a second detent of identical construction and location is provided in the case of rail 52 so as to yieldably retain and locate the carriage in its fully advanced position with the jaws engaged with the work pieces.

After the jaws 59 have been engaged with the work pieces, slide 57 is moved to the right, as viewed in FIG. 7, and thus causes the jaws mounted on the slide to move the work pieces from one die station to the next adjacent die station. As best shown in FIG. 15, the frame of carriage 55 has the form of a U-shaped channel 121 (see also FIG. 3) on which slide 57 is supported for longitudinal sliding movement by a series of rolls 122 attached to the sides of the channel. Slide 57 is also provided with a beveled face 123 extending longitudinally along each edge thereof, which face is engaged and supported by inclined rolls 124 mounted on the frame of carriage 55. Rolls 124 thereby retain the slide against upward movement away from rolls 122. The slide 57 is provided on its upper surface with a longitudinally extending T-slot 125 for receiving clamping bolts for adjustably securing jaws 59.

Actuation of slide 57 is effected by a multiplying linkage operated by lever 91 from cam arm 66 (FIG. 7). As best shown in FIGS. 7, 9, and 16, the means for operatively connecting lever 91 with slide 57 includes a lazy tongs linkage 126 and a rack and pinion device 127 (FIG. 9). As shown in FIG. 16, the left-hand end of the lazy tongs linkage 126 is attached to a pivot bolt 128 which is secured to the frame of carriage 55. At its opposite end, the lazy tongs linkage is connected to a pivot pin 129 (FIG. 9) which is mounted in a pinion carriage 130. Pinion carriage 130 has rotatably mounted thereon axles 131 and 132, pinions 133 and 134, respectively, which are independently rotatable and which mesh with a bottom rack 135, fixedly mounted in the bottom of channel 121 of carriage 55, and an upper rack 136 secured to the bottom face of slide 57. Hence, as pinion carriage 130 is moved by lazy tongs linkage 126, pinions 133 and 134 cause the slide 57 to be moved in the same direction as pinion carriage 130 but at twice the speed thereof. In other words, for a given movement of carriage 130, slide 57 is caused to move through a distance twice that of the carriage.

Additional amplification of movement is provided by the lazy tongs linkage 126 which is operated by lever 91. As shown in FIGS. 7, 15 and 16, the inner end of lever 91 is provided with a slot 137 which receives a roll 138 mounted on the bottom of a bolt 139 which serves as a pivot for the first pair of cross lengths of lazy tongs linkage 126. As shown in FIGS. 15 and 16, bolt 139 passes through and is secured to a crosshead 140 which is guided for reciprocatory movement in a pair of guides 141 secured to the bottom of carriage 55. Crosshead 140 tends to prevent any sidewise movement of pivot bolt 139 while permitting it to move longitudinally of the carriage within a slot 142 provided in the bottom thereof. Thus lazy tongs linkage 126 is constrained to move longitudinally within channel 121 of the carriage without appreciable sidewise movement therein. A very considerable amplification of movement of slide 57 may thus be obtained by the lazy tongs linkage, which, in turn, is increased two-fold by the rack and pinion device 127 (FIG. 9). This is important where work pieces are large and the distance between die stations is correspondingly great, thus requiring extensive travel of slide 57 in its transfer movements.

As heretofore noted, lever 91 (FIG. 7) is pivoted at 92 on carriage 55 so as to move with the carriage during its in and out movement along rails 51 and 52. During such movement of the carriage, the roll 90 on the forward end of the lever moves along slot 89 in carriage 81 to maintain an operative connection between the lever and the cam arm 66 in all positions of carriage 55. The stroke of carriage 81 and the travel of slide 57 may be varied to suit the requirements of a particular job by adjusting the screw 77 (FIG. 12) and moving crosshead 76 within the slot and rocker plate 74.

Slide 57 may be resiliently located in its advanced or extended position by suitable detent means such as a spring arm 143 (FIGS. 3 and 15) which may be suitably located and secured to the slide by means of T-slot 125, and which carries a roll 144 adapted to engage a notch 145 provided in a detent block 146 secured to the frame of carriage 55. Thereby, the slide 57 and jaws 59 will be accurately located with respect to the various die stations at the end of the transfer movement of the slide.

Figure 42:
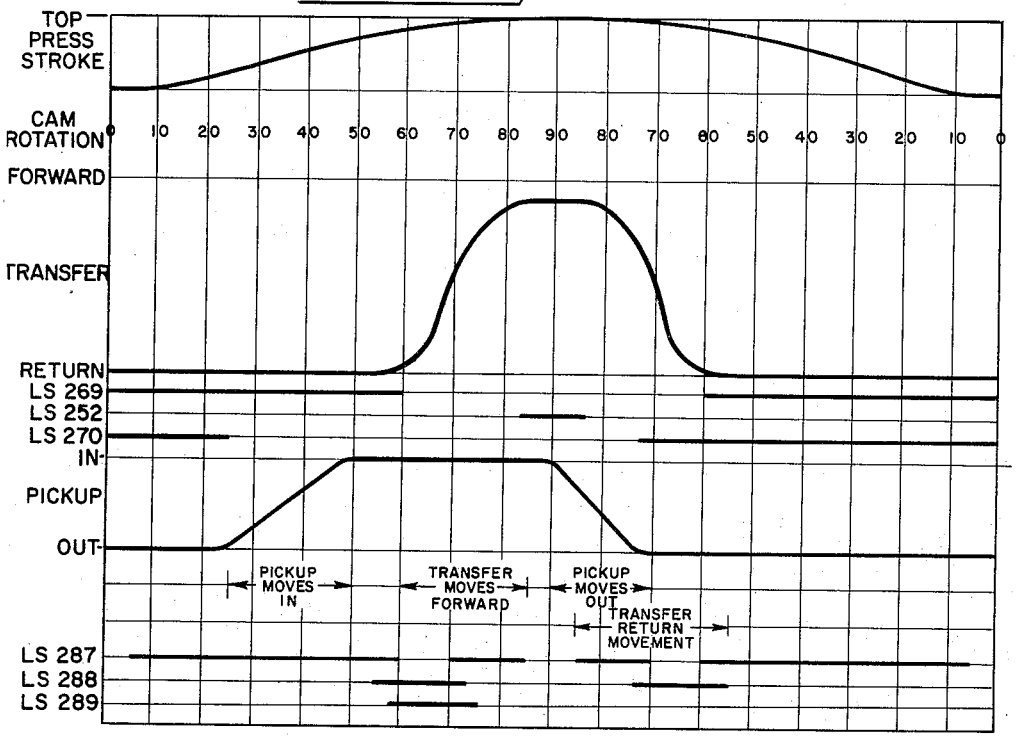
FIG. 42 is a coordinated timing chart which is illustrative of the interrelationship of the various elements in accordance with the invention.

The movements of carriage 55 and slide 57 with respect to one another, and with relation to the movement of ram 31, are such as to cause the work pieces being processed through the press to be transferred from one die station to a next adjacent die station as ram 31 approaches its upper limit of travel (see FIG. 42). As noted heretofore, actuator 43 receives 90° angular movement upon a stroke of ram 31 through suitable adjustment of crosshead 67 (FIG. 10) along the slot provided therefor in cam arm 66. The angular movement of cam arm 66 and drum cam 93 is depicted graphically in FIG. 19 where groove 72 of cam arm 66 and grooves 94—97 of cam 93 are shown in relation to a degree scale extending from zero to 90°. From FIG. 19, it will be noted that carriage 55 commences to move inwardly to engage jaws 59 with the work pieces after approximately 30 degrees of movement of actuator 43 by upward movement of ram 31. At this time, the workpieces are being elevated from the dies by suitable spring ejector pads (not shown) so as to be in position to be engaged by jaws 59. After 50 degrees of movement of the actuator, jaws 59 are fully engaged with the work pieces and shortly thereafter the cam groove 72 and cam arm 66 causes transfer movement of slide 57 to commence. After 85° of movement of the actuator during the upstroke of ram 31, the transfer movement of the work pieces to the next adjacent station has been completed and, at 90°, switch 99 has snapped up behind roll 105 and the mechanism is prepared for the down stroke of ram 31. As the downward movement of the ram commences, carriage 55 is immediately withdrawn outwardly to free jaw 59 from the work pieces, and as the jaws move outward, slide 57 commences to return to its initial position. Jaws 59 are withdrawn at the very outset of the downward movement of the ram so as to be clear of the punches carried thereby and, at the same time, return movement of slide 57 is taking place so as to restore the transfer mechanism to its starting position. On the next up stroke of ram 31, the operation is repeated and the work pieces are each advanced to the next adjacent die station, the work pieces at the last die station being transferred to chute 40 (FIG. 1) for discharge from the press.

As will be noted from FIG. 2, fingers 61 which engage behind work pieces 37 during transfer movement, are somewhat longer than fingers 62, which engage the forward edges of the work pieces. Hence, only a slight outward movement of carriages 55 and 56 is required to clear fingers 62 and thereby permit return movement of slides 57 and 58 to commence without disturbing the positioning of the work pieces.

It may be desirable to employ a modified embodiment of the transfer mechanism heretofore described. The embodiment presently to be described is basically as described in connection with the foregoing description in connection with FIGS. 3–20, inclusive, but differs primarily in respect of the means employed for causing inward or outward movement of carriage 55 on rails 51 and 52, and the means for imparting reciprocatory movement to slide 57. Referring to FIG. 25, cam arm 66 is driven from ram 31 by connecting rod 45 and is connected in the manner noted heretofore to connecting rod 79 for imparting movements thereto for the purpose of imparting amplified movement to slide 57. The timing and adjusting means illustrated in FIGS. 10 and 12 may be employed in the modification illustrated in FIG. 25, if desired. The right-hand end of connecting rod 79 is pivotally connected at 147 (best shown in FIG. 27) to a gear segment 148 which in turn is journaled at 149 in upstanding brackets 150 and 151 which are secured to the base plate 49. A shaft 152 carrying a pinion 153 and a gear 154 is journaled in bracket 150 and in housing 155. Pinion 153 meshes with gear segment 148 and gear 154 meshes with a second pinion 156 which is carried on a shaft 157 also journaled in housing 155. Shaft 157 carries at its opposite end a bevel gear 158 which meshes with a bevel pinion 159 which is carried by a shaft journaled in a second housing 160. Housing 155 and housing 160 are each secured to base plate 49. At the opposite end of shaft 161 which carries bevel pinion 159 is another gear 162 which meshes with still another gear 163 carried by shaft 164 which is also journaled in housing 160 (see FIG. 26).

The input motion is from segment 148 to pinion 153, through gear 154 to pinion 156, through bevel gear 158 to bevel pinion 159 so that a relatively small translational movement of rod 79 is transformed into a relatively large rotational movement of shaft 161, the precise amount depending upon the relative sizes of the gears and pinions so employed.

The amplified rotary motion so produced is transferred from shaft 164 through gears 162 and 163 to a shaft 165 which is journaled at each end thereof in suitable housings secured to carriage 55 by means of universal joints 166 and 167 secured to shafts 164 and 165, respectively. A splined shaft 168 is connected between universal joints 166 and 167 to transmit torque therebetween and at the same time being either extensible or collapsible to care for the variable distance between universal joints 166 and 167 upon movement of carriage 55.

In the interest of clarity, one type of motion transmitting device is illustrated for transfer slide 57 in FIG. 26 and another type of motion transmitting device is illustrated for carriage 55 in FIG. 29. However, it is to be understood that the device of FIG. 29 may be utilized for driving transfer slide 57 and likewise the motion transmitting device illustrated in FIG. 26 may be employed for driving carriage 55, and vice versa.

Referring now to FIG. 26, shaft 165 is provided with a worm or threaded portion 169 which is threadedly engaged by pinion carriage member 170. Member 170 is carried by the underside of slide 57 and thus slide 57 is caused to move either to the right or to the left, in FIG. 26, upon rotation of shaft 165, the direction of slide movement being dependent upon the direction of rotation of shaft 165.

In FIG. 29, an arrangement for causing carriage 55 to move to a position for engaging a work piece and for retracting the carriage is illustrated wherein a rotatable shaft 187 is provided with a threaded or "grooved" portion 189 engaging balls 173 which are also engaged by a member 190 secured to the underside of carriage 55 (FIGS. 26 and 29). The arrangement illustrated in FIG. 29 is referred to as a recirculating ball type of drive and is particularly desirable when operating and service requirements require a positive and almost friction free type of device, ability to withstand impact loading with little tendency to wear, and excellent service life characteristics.

Still referring to FIG. 29, the worm or "grooved" portion 189 includes a groove 171 having a high pitch. Grooves 172 are provided in member 190 and are spaced apart by an amount corresponding to the pitch of grooves 171 and 172 may cooperatively receive balls 173. Upon rotation of shaft 187, member 190 is driven either to the right or to the left depending upon the direction of rotation due to the fact that balls 173 are received and retained by both grooves 171 and 172.

A modified rack and pinion device is also illustrated in FIG. 29. Pinion carriage 170 carries a pair of outwardly extending axles 174, one of which is visible in FIG. 29, on which are free to rotate a pair of integral pinions 175 and 176. The right and the left-hand pinions 175 mesh with the teeth of racks 177 which are secured to the U-shaped or channel member 121 and the right and the left-hand pinions 176 mesh with the teeth of similar racks 178 which are secured to and carried by the underside of slide 57. Thus, as shaft 165 rotates, the pinion carriage member 170 is caused to move to the right or to the left (FIG. 26), depending upon the direction of rotation of shaft 165. The action of pinions 175 and 176 and racks 177 and 178 is somewhat similar to the rack and pinion device 127 previously described but differs in that pinion 175 meshes only with lower rack 177 and pinion 176 meshes only with upper rack 178. Accordingly, the rack and pinion arrangement of FIG. 29 permits not only greater flexibility as to the degree or amount of motion amplification that may be obtained but also permits much greater motion amplification to be obtained within whatever space limitations may exist.

An additional advantage of this arrangement is in the increased rigidity which is provided due to the fact that carriage 170 is at all times guided by and travels along the axis of the shaft 165 with no appreciable tendency toward sidewise movement of carriage 170. This is true if the recirculating ball type of arrangement of FIGURE 29 is employed as well as in the case of the worm and thread arrangement of FIG. 26 since the only sidewise movement that is permitted is whatever clearance may exist between threaded portion 169 and carriage 170 or between balls 173 and grooves 171 and 172. Thus, referring to FIGS. 25, 26, 27 and 29, movement of connecting rod 79 is amplified and transmitted by the gearing at the left-hand side of FIG. 25 and transmitted as rotary movement to shaft 164 (FIG. 26). The rotation of shaft 164 is transmitted to universal joints 166 and 167 and splined shaft 168 to rotate threaded portion 169 of shaft 165 and thus, by means of carriage 170, pinions 175 and 176 and racks 177 and 178, provide greatly amplified linear movement which is transmitted to slide 57. Such an arrangement provides an extremely positive type of drive which will hold up under repeated shock loading throughout a long service life.

Referring now to FIGS. 25, 30, 31, and 34, the means for transmitting movement to carriage 55 will next be described. Movement of drum cam 93 is effected in the manner previously described and this cam is provided with the structural features heretofore noted. A follower roll 179 (FIGS. 30 and 31), carried by a gear segment 180 (FIGS. 30 and 31), engages the grooves of drum cam 93 and thereby causes rotation of the gear segment upon rotation of the cam. Gear segment 180 is supported by a pivot bolt 181 so that gear segment 180 is caused to rotate about pivot 181 or to remain stationary depending upon whether or not the follower roll 179 is at that moment in the inclined jaw engaging portion 95 or 97 (FIGS. 4 and 19) or is in the straight portions 94 or 96 (FIGS. 4 and 19). Gear segment 180 meshes with a pinion gear 182 which is fast on a shaft 183. A bevel gear 185 is also fast on shaft 183 which is journaled at its lower end in base 49 (FIG. 29) and at its upper end in an upstanding bracket 184 which is integral with base 49 or is secured thereto (FIGS. 29 and 31). Bevel gear 185 meshes with a bevel pinion 186 which is fast to shaft 187 which is journaled for rotation in a bearing housing 188 secured to base 49. Shaft 187 is provided with a worm or threaded end portion 189 which meshes with a member 190 secured to the underside of carriage 55 as shown in FIGS. 26 and 29. This may be a re-circulating ball arrangement, previously described. Upon rotation of shaft 187 carriage 55 is thereby caused to move inwardly in a direction to engage jaws 59 or outwardly to disengage the jaws depending upon the direction of rotation of shaft 187.

As is best shown in FIG. 30, gear segment 180 is provided with a slotted portion 191 having a cam surface 192 at one side thereof. In certain positions of gear segment 180, a follower roll 193, best shown in FIG. 34, bears against cam surface 192 under the action of a strong spring 194, follower roll 193 being carried by an arm 195 pivoted at one end thereof at pivot 196. Roll 193, arm 195 and pivot 196 are supported by upstanding bracket 197 which is secured to base 46.

As noted heretofore, follower roll 193 bears against the surface of cam 191 during certain positions of gear segment 180. When the gear segment is in other positions, such as illustrated in FIG. 30, follower roll 193 bears against the under side of gear segment 180. When gear segment 180 is in the position shown in FIG. 30, carriage 55 is fully retracted, as is indicated in FIG. 29. Upon counter clockwise rotation of gear segment 180 and just before jaws 59 come into engagement with a work piece, the relationship of gear segment 180 and follower roll 193 is such that the roll leaves the underside of gear segment 180 and begins to engage cam surface 192 as shown in FIG. 34. The action of spring 194 thereby exerts a strong biasing action on gear segment 180 thereby acting as a damper and taking up whatever play may exist in the drive so that jaws, 59, 60 will firmly grip and remain engaged with the workpieces until gear segment 180 is rotated in a clockwise direction (FIG. 30) under the action of drum cam 93 and follower roll 179 returns to the position shown in FIG. 30.

Because, as noted heretofore, the strong biasing action of spring 194 subjects gear segment 180 to a force tending to lift it, and thus perhaps cause binding of the gear segment with respect to its pivot, there is provided a second follower roll 198 spaced from roll 193 and which is journaled for rotation and for engagement at all times with the underside of gear segment 180 to prevent such binding.

As previously noted, one of the important features of the present invention is its versatility and adaptability for use with different presses. For example, in at least one instance, an unusually difficult problem was encountered in that the size of the work pieces to be formed was such that it pas necessary to provide approximately 42 inches of transfer movement with only 2½ inches of ram movement.

In all of the embodiments illustrated and described thus far, cam arm 66 not only controls the sequence and timing of the transfer operations but in addition supplies all of the drivnig force for effecting movement of the transfer slide 57. Where very large amounts of transfer movement are required as compared to relatively small movements of the ram of the press, transfer must be effected in a relatively few degrees of rotation of cam arm 66 and thus the transition in groove 72 from portion 86 to 87 is extremely abrupt and portion 87 is extremely steep. Stated differently, the nature of this type of problem is such that it results in and requires extremely rapid acceleration of relatively large masses and therefore very large forces are involved which are imposed on bearing surfaces, cam surfaces, rollers, etc. Accordingly, I provide supplementary drive means for effecting the transfer movements which is connected with the various other elements and is controlled in a novel fashion so as to provide supplementary driving force during a portion of the complete operating cycle and in such a way as to minimize the large acceleration forces previously referred to.

Referring now to FIGS. 44 and 47, there is illustrated a combination of the arrangements shown in FIGS. 10, 12 and 27. A support member 199 which may be connected directly to base plate 49 or, as illustrated, bolted to upstanding bracket 150, pivotally supports one end of a power cylinder 200 by pin 201. Within the power cylinder is a reciprocable piston 202 having at one end thereof a rod 203, the lower end of which is pivotally connected to rock arm 74 by a pivot bolt 204. Ports or connections 205, 206 are provided at each end of cylinder 200 for receiving fluid under pressure or for exhausting such fluid from the cylinder. In order to control the position of or cause movement of piston 202 a control valve 207 is provided having ports 208 and 209 connected to cylinder ports 205 and 206, respectively. Control valve 207 is also provided with a supply port 210 to which fluid is supplied under pressure and an exhaust port 211 from which fluid may be discharged. The interior portions of control valve 207 are illustrated diagrammatically in FIG. 46. Control valve 207 is provided with a reciprocable spool-like member 212 slidably received within a chamber 213. Spring 214 urges the spool-like member to the right in FIG. 46. In the position of spool-like member 212, shown in FIG. 48, communication is established between supply port 210 and port 209 so that fluid under pressure is admitted to the lower end of cylinder 200 through port 206 thereby tending to move the piston toward pin 201 thus tending to rotate rock arm 74 in a clockwise direction. In this position of the spool-like member, communication is also established between exhaust port 211 and port 208 so that fluid will be exhausted from cylinder 200 through port 205 and finally exhausted through exhaust port 211 of the control valve.

As indicated in FIGS. 44 and 47, control valve 207 is supported by an upstanding bracket 215 which is detachably and adjustably connected to base plate 49. Upstanding bracket 215 also supports a valve control member 216 by a pivot bolt 217 so that the valve control member is free to pivot in either a clockwise or counterclockwise direction with respect to pivot bolt 217. Valve control member 216 is provided with an abutment portion 218 which is adapted to engage the exposed end of spool-like member 212 when the valve control member 216 is in at least one position. A spring 219 is connected to the valve control member and to upstanding bracket 215 so as to bias abutment portion 218 into engagement with the end of spool-like member 212. Said one position of valve control member is illustrated in FIG. 48.

From the foregoing description, it will be apparent to those skilled in the art that control valve 207 is a commercially available item which is referred to as a two-position valve. In order to provide means for actuating such valve, a cam 220 is detachably and adjustably secured to drum cam 93. It will be recalled that drum cam 93 and cam 66 are mounted on a common shaft so that by locating cam 220 on drum cam 93 at such a location cam 220 will engage a roller 221, carried on the free end of control member 216 at the time when roll 73 starts to enter portion 87 of cam groove 72, the valve control member 216 is lifted to the position illustrated in FIG. 49, thereby interrupting communication between inlet portion 210 and cylinder port 206 so that the supply of fluid under pressure to the rod end of piston 202 is cut off. Simultaneously communication is established between exhaust port 211 and cylinder port 206 thereby relieving the pressure on the rod end of piston 202. At the same time communication is established between inlet port 210 and cylinder port 205 to admit fluid under pressure to the opposite or upper side of piston 202 thereby tending to rotate rock arm 74 in a counter-clockwise direction and thus assist roll 73 to make the abrupt change in direction required in entering portion 87 of cam groove 72. Stated differently, the application of fluid under pressure to the upper side of piston 202 when valve control member 216 is lifted by cam 220 not only tends to rotate rock arm 74 in a counter-clockwise direction about pivot 217 but may also be thought of as supplying driving force for moving connecting rod 79 to the right, thereby supplying a substantial amount of driving power to the gear segment 148 for effecting the transfer movement of slide 57 and thereby diminishing the amount of driving force that must be supplied by cam 66. In this connection, it will be apparent that various arrangements may be employed as desired. For example, it is possible to design the apparatus so that substantially all of the driving force is derived from piston 202, cam 66 in such case serving primarily as a control and timing means. On the other hand, if the piston and cylinder arrangement are completely omitted, all of the driving force is supplied by cam 66, and various intermediate arrangements are possible whereby piston 202 supplies part of the driving force and the remainder is supplied by cam 66.

As previously noted, piston 202 tends to move connecting rod 79 to the right in FIG. 44 or to rotate rock arm 74 in a counter-clockwise direction when valve control member 216 is lifted by cam 220. This condition will continue to exist as long as valve control roller 221 remains in engagement with cam 220 but, as drum cam 93 continues to rotate in a clockwise direction, cam 220 will clear valve control member 216 in its lifted condition at which time the valve control member will return to its original position under the action of spring 214 which is relatively stronger than biasing spring 219.

As noted heretofore the time at which the fluid under pressure is removed from the rod end of piston 202 and applied to the opposite end thereof is controlled by the relative location of cam 220 on drum cam 93 relative to the location of the beginning of transition portion 87 of cam groove 72. Accordingly, I provide slots 222, 223 in the side portion of cam 220 so that its relative location on drum cam 93 may be adjusted to suit the varying requirements which may arise from utilization of the apparatus and different types of service. It was also noted in the preceding paragraph that the length of time that valve control member 216 remains lifted depends upon the length of cam 220. Hence, this cam is made in two portions 224 and 225 but illustrated in FIG. 45 with a tongue and groove arrangement 226 so that roller 221 of the valve control element will ride on an uninterrupted surface of cam 220 and at the same time the length of that cam may be adjusted to suit variable requirements. For example, in certain applications it may be desirable to apply supplementary power to connecting rod 79 at all times when roll 73 is within the transition portion 87 of cam 66. In still other types of service, it may be desirable to assist acceleration with supplementary power only during the acceleration period and to reverse the action of piston 202 during the deceleration period thereby providing a cushioning effect. Thus, by providing means for adjusting the location at which cam 220 is secured to drum cam 110 and also providing means for adjusting the length of cam 220, supplementary power can be supplied when it is desired and for the desired length of time thus providing an apparatus which is extremely versatile insofar as coping with varying operating requirements.

In FIG. 44 the ram of the press is at the bottom of its down stroke and it previously has been explained how supplementary power is applied by piston 202 at the proper time upon rotation of drum cam 93 so that cam 220 lifts valve control member 216. In the reverse direction, as drum cam 93 rotates in a counter-clockwise direction, at some point during the rotation, cam 220 will again engage roller 221 thereby depressing valve control member 216 to the position illustrated in FIG. 50. The valve control member 216 will remain in this position until drum cam 93 has rotated a sufficient amount for cam 220 to clear roller 221, at which time the valve control member 216 will be returned to its initial position, as illustrated in FIG. 48, under the influence of the biasing spring 219. However, when valve control member 216 is depressed to the position illustrated in FIG. 50 abutment portion 218 merely comes away from and out of engagement with the end of the spool-like member 212 of control valve 207. Therefore, this action has no effect on piston 202. Thus it will be seen that piston 202 at all times urges rod 79 to the left in FIG. 44 except during one part of the operating cycle when drum cam 93 is rotating in a clockwise direction so that cam 220 will lift valve control member 216.

FIGS. 21, 22, 23, 24 and 39 illustrate features of a feeding and loading device 39 which, in cooperation with the transfer mechanism previously described, transfers work pieces to the first work station of the press to be acted upon by the action of punches 35 and dies 36. The loading or feeding device 39 comprises a frame 226 adapted to be secured to the press bed 32 at one side thereof as indicated in FIG. 1. Frame 226 includes a table portion 227 at any convenient height suitable for feeding raw work pieces to be received by jaws 59, 60 of the transfer mechanism. Frame 226 also supports chain and sprocket devices 228 with the uppermost portion of chain 229 disposed in a plane substantially horizontal and slightly beneath the surface of table portion 227 as is best shown in FIG. 22. Chain 229 is driven by a sprocket 230 fast on a shaft 231 which in turn is driven by a rack and pinion device 232. Pinion 233 is also fast to shaft 231 and meshes with a rack 234 the upper surface of which is guided by rolls 235 which are supported on frame 226. As shown at the right-hand side of FIG. 22, supported on frame 226 is an idler pinion 236 over which chain 229 passes and then returns to the lower side of sprocket 230.

I provide driving means in the form of a pneumatic cylinder 237 comprising a double-acting piston 238 having a piston rod 239. Piston rod 239 is connected to rack 234 and thus when piston 238 of cylinder 237 is caused to reciprocate, it effects reciprocatory motion of chain 229. As illustrated in FIGS. 21 and 22, the horizontal portion of chain 229 lying slightly below table portion 227 has secured thereto a lug 240 against which raw work stock is placed and which serves to push the raw stock forward and into position where it can be received by jaws 59 and 60 of the transfer mechanism. For reasons which will appear as the description proceeds, lugs 240 include plungers 241 which are urged to the top in FIG. 21 and to the left in FIG. 22 by a spring 242.

To insure that the raw stock will be fed to such a position that it may be picked up by the jaws 59 and 60 of the transfer mechanism, I provide retractable locating means. It is important that such means be made retractable in order to avoid physical interference when a work piece is transferred from the loading mechanism to the transfer mechanism.

The locating means include a pin 243 slidable in a bushing 244 which is secured to frame 226 and has its upper surface flush with the table top portion 227. As illustrated in FIG. 21, there is a pin and bushing device at each side of the forward edge of table portion 227 adjacent each of sprockets 230. As is best shown in FIG. 23, the lower end of pin 243 is provided with a head 245 and a spring 246 is interposed between head 245 and the lower face of bushing 244 to continuously urge pin 243 in a downward direction. As is shown in FIG. 21, sprockets 230 are located near the end portions of shaft 231 which extends therebetween and has end portions which extend beyond sprockets 230. As is best shown in FIG. 23, such end portions of shaft 231 carry cams 247 fast thereto. A rocker arm 248 is pivoted at 249 and bears against the surface of cam 247 as well as head 245 of pin 243. In the position shown in FIG. 23, cam 247 has been rotated by shaft 231 to a position whereby cam 247 causes rocker arm 248 to pivot about 249 and thus force pin 243 upward against the action of spring 246. When shaft 231, and consequently cam 247, have rotated approximately 180° from the position shown in FIG. 3, the action of spring 246 causes rocker arm 248 to rotate in a clockwise direction about pivot 249 so that pin 243 will be in a fully retracted position; that is, its uppermost end portion will be flush with or below the top surface of table portion 227. When pin 243 is in the position shown in FIG. 23, it serves as a locating means and prevents raw stock from being fed too far into the press and insures that the stock will be located at a point where it can be picked up by the jaws 59 and 60. There is also provided means for locating the raw stock in a second direction. This is accomplished by the provision of locating pins or buttons 250 and 251 located at one side of the table portion 227 and best illustrated in FIG. 21. Pins or buttons 250 and 251 extend somewhat above the top surface of table portion 227 and, since these pins or buttons contact only the side edge of the work pieces it is not necessary to make them retractable.

The cooperation of the loading mechanism with the transfer mechanism and other devices to be described will be described hereinafter. For the present purposes it will suffice to state that an operator places a piece of raw stock on the table portion 227 in abutment with lugs 240 carried by chains 229. One edge of the stock abuts pin 250 to place the stock in proper position for the feeding operation. At a suitable time in the sequence of operations of the entire apparatus, pressure is admitted to the right-hand end of pneumatic cylinder 237 so that piston 238 is urged to the left thereby thus causing rack 234 to move to the left (FIG. 22) and thus rotate pinion 233 in a counter-clockwise direction. Rotation of pinion 233 likewise causes counter-clockwise rotation of sprockets 230 since the sprockets and the pinion are fast to shaft 231 and thus chain 229 is caused to move to the left in FIG. 22 (and in FIG. 21, toward the top of the drawing). Since lugs 240 are carried by chains 229, movement of the chains also advances the lugs and thus they push the work piece previously placed in abutment therewith inwardly toward the press (to the left in FIG. 22 and toward the top in FIG. 21). As noted heretofore, pins 243 serve to prevent too much advance of the work stock for any reason. At a suitable time, the action of pneumatic cylinder 237 is reversed thereby causing the rack to move back, to the right in FIG. 22, thereby returning the chains 229 and lugs 240 to their initial position. As noted heretofore, when shaft 231 is rotated to the proper position, pins 243 become fully retracted and lie below the top surface of table portion 227 to allow the transfer mechanism to pick up and advance work pieces which have previously been advanced to contact locating pins 243.

As noted heretofore, lugs 240 have spring-biased plungers 241 which engage and move the raw sheet stock forward against positioning pins 243. Plungers 241 are yieldable against the action of springs 242 to minimize shock when the lugs engage a sheet of raw stock and also to prevent binding of a sheet between pins 243 and lugs 240 if the width of a sheet is excessive. Pins 243 rise as the sheet is advanced to engage the sheet and properly locate it for subsequent engagement and gripping by jaws 59, 60. Pins 243 are retracted during the retraction of lugs 240 so that the sheet can be gripped by jaws 59, 60 and advanced thereby into the press.

I provide means for insuring the proper sequence of movements and also for insuring that one movement is completed before a successive movement is initiated not only for the purpose of assuring proper operation but also in the interest of safety. For example, I provide a plurality of limit switches connected together and to various other elements in such a way as to require that each switch be either open or closed at a proper time during an operating cycle in order to permit continued operation of the press or other mechanism and to immediately stop the operation of the press if each of such switches is not opened or closed in proper sequence. One such switch is illustrated at 252 in FIG. 26. Limit switch 252 is secured to the base 49 of the transfer mechanism and this particular switch is utilized for the purpose of determining whether or not the transfer slide 57 completes its transfer motion. Since, as previously noted, the transfer apparatus is intended for use in different presses, the amount of transfer movement of slide 57 is adjustable and hence special means are required for the purpose of tripping switch 252.

The tripping means are best illustrated in FIGS. 32, 35 and 36. Journaled in support member 253 and rotatable therein is an adjusting rod 254 secured to one end of which is a bevel gear 255. Secured to the other end of rod 254 is a knob 256 so that rotation of knob 256 by an operator causes bevel gear 255 to rotate the same amount and the same direction in which knob 256 is turned. As illustrated in FIG. 35, rod 254 is provided with a threaded portion 257 carrying an adjusting nut 258 which when screwed tightly against the face of support member 253 serves to lock bevel gear 255 in a desired position. A rod 259 is slidably and rotatably supported by a portion of support member 253 and by a bushing 260 which in turn is rotatably journaled in another portion of support member 253. The left-hand portion of rod 259 is provided with a threaded portion 261 engaging internal threads in bushing 260 so that, as bushing 260 is rotated, rod 259 is caused to move either to the right or to the left, in FIG. 35, depending upon the direction of rotation. Bushing 260 has an axially extending hub portion 262 carrying a bevel gear 263 in mesh with bevel gear 255. The axially extending hub portion 262 is provided with a slot 264 which receives a pin 265 carried by the hub portion of gear 263. Thus it will be seen that as knob 256 is rotated by an operator, rod 254 and gear 255 are caused to rotate which in turn causes rotation of bevel gear 263 thereby causing bushing 260 to rotate and rod 259 to move either to the right or to the left depending upon which way the operator turns knob 256.

As best shown in FIGS. 32 and 35, rod 259 is provided with a slot 265 which receives a pin 266 carried by support member 253. Thus it will be seen that rod 259 is free to slide but not to rotate relative to support member 253 and U-shaped member 121. Thus it will be seen that rod 259 may be adjusted so that the under portion of transfer slide 57 will engage the end of rod 259 at some desired location of slide 57 with reference to U-shaped member 121.

As indicated above, when slide 57 engages rod 259, at its right-hand end in FIGS. 35 and 36, rod 259 will slide relative to member 253 but cannot slide relative to bushing 260. Accordingly, in FIG. 36, bushing 260 will be moved to the left when the under side of transfer slide 57 engages rod 259. Pivotally supported on support member 253 is a rock arm 267 which is caused to rotate in a counter clockwise direction when bushing 260 moves to the left as described above. When rock arm 267 is caused to rotate in the manner just described, it engages and trips limit switch 252 as is best shown in FIG. 36.

The location of limit switch 252 is best shown in FIGS. 32 and 26. Referring now to FIG. 32, carriage 56 which includes U-shaped member 121 is in its retracted position so that rock arm 267 is spaced somewhat to the right of limit switch 252. However, when the carriage 56 and thus U-shaped member 121 is moved inwardly so that jaws 59 are in position to engage a work piece, rock arm 267 will be in line with the roller 268 of limit switch 252 and will be rotated in the manner already described so as to trip the limit switch when transfer slide 57 completes its transfer motion, that is, to the right in FIGS. 25 and 26. A similar limit switch 269 (not shown) is provided at the other end of bed or base plate 49 and is tripped in an identical manner and by correspondingly similar means to that employed for tripping switch 252. Switch 269 is so aligned with its tripping mechanism and with U-shaped channel 121 so as to be tripped when the carriage 56 (including U-shaped member 121) is in its fully retracted position and slide 58 has returned to its "home" position at the extreme left, in FIG. 25, from its transfer position.

A third limit switch 270 (FIGS. 25 and 32) is also mounted on base plate 49 and is engaged by carriage 56 so as to trip switch 270 when the carriage is in its fully retracted position.

FIG. 33 illustrates stop means utilized as a safety precaution to prevent possible over-travel of carriage 56 including U-shaped member 121 beyond predetermined limits either in a retracted direction or in an extended direction. Such means include a pair of upstanding brackets 271, 272 secured to base plate 49. A stop 273 for the retracted position threadily engages bracket 271 and is locked in the desired position by means of a lock nut 274. A similar stop 275 is provided in bracket 272 and is locked by lock nut 276. A downward projection 277 from the under side of carriage 56 (including U-shaped member 121) engages either stop 273 or 275 to prevent over-travel of the carriage.

In addition to limit switches 252, 269, and 270 which are interconnected with control means presently to be described, additional safety features are provided and are also interconnected with said control circuit in insure proper and safe operation of the entire apparatus.

One such additional feature is the inclusion of means for determining whether or not a work piece has been properly transferred from one work station to a succeeding work station and for permitting continued operation of the apparatus if such is the case and for immediately discontinuing the operation of the apparatus if such is not the case. To achieve this purpose I provide a plurality of pairs of photocells 278, 279 which are disposed at opposite sides of the work stations 36 as illustrated in FIG. 37. Photocells 278 are mounted on a bar 280 which is supported at one side of the work stations and parallel to the transfer movement. Bar 280 is suitably supported by brackets 281, 282 secured to base plate 49. Photocells 279 are similarly adjustably mounted and supported on a bar 283 similarly supported and parallel to the direction of transfer movement. Photocells 278 and 279 are aligned opposite each other so that a beam of light passes from one photocell to the other substantially at the leading edge of each of the work stations 36; that is, at the right-hand side thereof in FIG. 37. Wiring connections, 284, 285 connect photocells 278 and 279 respectively, to a control unit 286. Photocells 278 and 279 thus may determine whether or not a workpiece has been properly transferred and is in proper position for successive operations following a transfer movement and thus provide a means of signaling the control unit 286 whether or not the operation of the apparatus is to continue or whether it is to be discontinued. The precise manner in which this is done as well as the complete operation of the control apparatus will be described presently.

Still other means are provided for insuring proper coordination and sequence of operation of the various elements of the apparatus already described. Included for this purpose are a plurality of limit switches 287, 288, 289 which are mounted on and supported at appropriate locations on the upright portions of press 30 as illustrated in FIGS. 40 and 41. Ram 31 of the press carries cams 300, 301 and 302 which are spaced apart at appropriate intervals on ram 31. The manner of functioning and the way in which these elements are connected with other cooperating elements will be described more particularly in connection with the description of the control for the apparatus. For the present it will suffice to state that the purpose and function of limit switches 287, 288, 289 and cams 300, 301, 302 is to insure that ram 31 is in a proper location at a proper time, is moving in the proper direction, and that events take place in proper sequence with reference to other elements of the apparatus.

The control wiring diagram is shown diagrammatically in FIG. 43 and control unit 286 FIG. 37, includes the material illustrated and described in connection with FIG. 43. The relationship of movements of various elements is shown in FIG. 42 with reference to degrees of cam rotation of cyclically operable actuators 43 and 44. In this connection, it is to be understood that FIG. 42 is a diagrammatic representation which is illustrative of the operation only. For example, the relative timing between the transfer and pick-up movements may vary substantially from machine to machine without departing from the invention.

Figure 43:
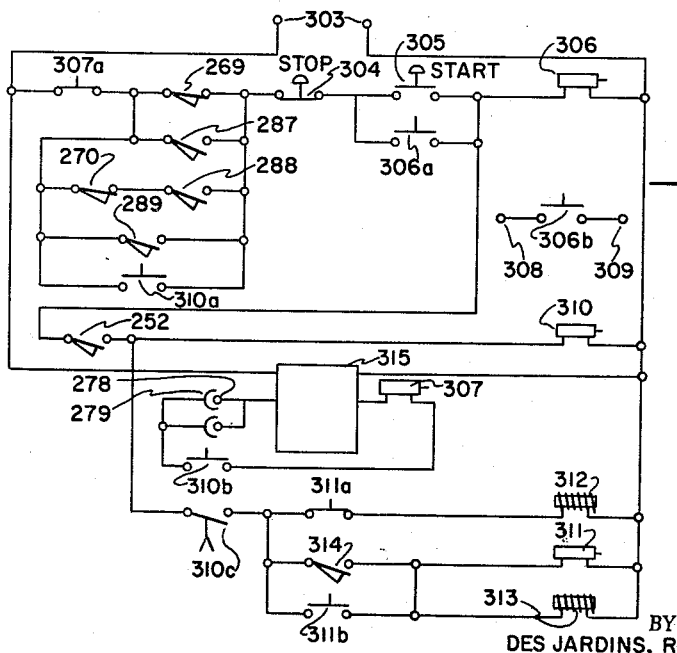
FIG. 43 is a schematic wiring diagram illustrating the electrical interconnections between the various elements in accordance with the invention.

Referring now to FIG. 43, there are provided a pair of terminals 303 which are adapted to be connected to and receive voltage from a suitable source of electrical energy (not shown). In series with terminals 303 are connected limit switch 269, a stop push button 304, a start push button 305, coil 306 of a relay and contacts 307a of a relay 307. Start push button 305 is connected in parallel with a set of contacts 306a actuated by coil 306 to provide a hold circuit for coil 306 once it has been energized by depressing start push button 305. Press 30 is driven by an electric motor (not shown). The motor starting circuit is entirely conventional and in the interests of clarity is not shown except for contacts 306b which are connected in series with terminals 308, 309. Terminals 308 and 309 are connected in series with the motor starting circuit in a well-known manner to discontinue the flow of electrical power to the motor when contacts 306b are open. Contacts 306b are normally open, that is, these contacts are open when coil 306 is de-energized and are closed when coil 306 is energized. Likewise, holding contacts 306a are open when coil 306 is de-energized and are closed when coil 306 is energized. Connected in parallel with limit switch 269 are limit switches 287, 289, and contacts 310a of a relay-timer 310. Limit switches 270 and 288, previously referred to are series connected with each other and these two switches so connected, also are connected in parallel with limit switch 269. Limit switch 252 and the coil of relay-timer 310 are series connected with respect to each other and in parallel with coil 306. That side of coil of relay-timer 310 which is connected to limit switch 252 is also connected in series to a set of relay-timer contacts 310c which in turn are series connected to a set of contacts 311a which in turn are series connected to a solenoid actuated valve, the coil 312 of which is connected to the opposite side of relay-timer coil 310. Connected in parallel with contacts 311a and coil 312 of the solenoid operated valve is a limit switch 314 and relay coil 311, which relay coil and limit switch are series connected with respect to each other. Also connected in parallel with contacts 311a and solenoid coil 312 are a set of contacts 311b and solenoid coil 313, coil 313 and contacts 311b being connected into series with respect to each other with a connection between coil 311 and coil 313, such connection being between coil 311 and limit switch 314 and between coil 313 and contacts 311b.

Connected in parallel with contacts 307a and limit switch 269, stop button 304, start push button 305, and coil 306 is a photoelectric cell amplifier 315. Photocells 278 and 279 are connected in series with photocell amplifier 315 relay-timer contacts 310b, and relay coil 307 as indicated in FIG. 43. Additionally, each pair of photoelectric cells 278 and 279 is connected in parallel with respect to all other pairs, as indicated in FIG. 43, for reasons which will become apparent as the description proceeds. Relay-timer 310 having contacts 310a and 310b which instantly close when coil 310 is energized, also is provided with "delay" contacts 310c which operate in such a manner that contacts 310c become closed only after coil 310 has become energized and upon the expiration of a preselected delay period in order to insure that the photoelectric cell's circuit has time to sense an incomplete transfer and stop the press before the loading mechanism brings another part forward.

The conditions illustrated in the schematic diagram of FIG. 43 are with ram 31 in its lowermost position, with jaws 59 and 60 fully retracted, and with slide 57 in its "home" position, that is, in its extreme position to the left in FIGS. 2, 7, 25, and 37. Under such conditions, limit switch 269 is engaged by its rock arm and is therefore closed. Limit switch 270 is also closed, but all other limit switches are in their open position. To start the press, an operator depresses start push button 305 which energizes coil 306 thereby closing holding contacts 306a and contacts 306b in the motor starting circuit thus driving the press. Since contacts 306a are in a holding circuit in parallel with start push button 305, coil 306 will remain energized when the start push button 305 is released. Relay 307 is a normally closed relay, that is, contacts 307a are closed when coil 307 is not energized and contacts 307a are open when coil 307 is energized. Hence, operation of the press is begun as described above when start push button 305 is depressed. The press motor is stopped by pushing stop push button 304 which de-energizes coil 306 thus opening contacts 306b in the motor circuit.

As ram 31 starts its upward movement, limit switch 287 is closed by cam 300 (see FIGS. 40 and 41). The action of drum cam 93 causes carriage 55 to move onwardly away from its fully retracted position so that jaws 59, 60 may engage and pick up a work piece. When this occurs, limit switch 270 (which is closed when carriage 55 is fully retracted) opens but the press remains in operation because limit switch 269 still remains closed, the slide 57 still being in its home position. Limit switch 269 remains closed until jaws 59 and 60 has moved fully inward and engaged a work piece and slide 57 has begun the transfer operation by moving to the right. When this occurs, limit switch 269 opens and limit switch 252 does not close until the transfer movement, that is, movement of slide 57 to the right, is very nearly completed as is indicated in FIG. 42. However, between the time that limit switch 269 is opened and limit switch 252 is closed, the circuit is completed and the press will remain in operation because of the previous closing of limit switch 287 by cam 300 upon the beginning of upward movement of ram 31. When limit switch 252 closes, relay-timer coil 310 is thereby energized thus immediately closing contacts 310a and 310b and, as noted heretofore, upon the expiration of a preselected time delay, to also close contacts 310c. As may be noted from FIG. 43, contacts 310a are in the circuit with relay coil 306 which controls the operation of the press, contacts 310b energize the photoelectric cell circuit, and time delay contacts 310c are connected in the circuit for actuating the feeding or loader mechanism.

Before ram 31 reaches the top of its upward stroke, limit switch 289 is closed by the action of cam 302 to maintain relay coil 306 in an energized condition while detent 300a in cam 300 passes limit switch 287. At the top of the stroke of ram 31, cam 300 is not in engagement with limit switch 287, as is indicated in FIG. 41, and hence, limit switch 252, through the contacts which it controls, is the only switch that can maintain the circuit for keeping relay coil 306 energized. If, for any reason, the transfer operation is not fully completed so that limit switch 252 is not engaged, contacts 310a remain open because coil 310 has not been energized by the closing of switch 252, and therefore relay coil 306 is de-energized to stop the press. On the other hand, if the transfer movement is completed in a normal manner so that limit switch 252 is engaged and closed at the completion of the transfer movement, relay coil 310 is energized by the closing of limit switch 252, thereby closing contacts 310a to provide a holding circuit for keeping relay coil 306 energized and thus the press will remain in operation.

As noted heretofore, relay 307 is a normally closed relay so that the contacts 307a are closed when relay coil 307 is de-energized and these contacts are opened when relay coil 307 is energized. The photoelectric cell amplifier circuit is connected as shown in FIG. 43 with amplifier 315 connected across the line and thus continuously energized so that it is maintained in a warmed-up condition. Upon energizing relay coil 310 by the closing of limit switch 252 upon completion of the transfer operation, contacts 310b are closed to energize the photoelectric cell circuit. If any one of the pairs of photoelectric cells 278 and 279 conduct, indicating the absence of a part at one of the die stations and therefore an incomplete transfer, relay coil 307 is energized thereby opening contacts 307a and interrupting the flow of current to relay coil 306, thereby immediately stopping the press. On the other hand, if none of the pairs of photocells 278 and 279 conduct, relay coil 307 remains de-energized and contacts 307a remain closed and the press continues to operate.

As noted heretofore, contacts 310c are caused to close only after the expiration of a predetermined time delay after relay coils 310 has been energized by the closing of limit switch 252. This delay is provided to insure that the photoelectric cell circuit has sufficient time to sense a condition of incomplete transfer and to stop the press before the feeding or loading mechanism brings another part forward to be picked up by the transfer mechanism. Upon the expiration of such delay, when contacts 310c close, solenoid 312 is energized to actuate the solenoid actuated valve controlling the pneumatic cylinder 237 (FIG. 39) and thus move piston rod 239 and hence lug 240 forward, that is, to the left in FIG. 22. Solenoid 312 is first actuated upon closure of contacts 310c because relay 311 has a set of normally closed contacts 311a which are closed when relay coil 311 is de-energized and a second set of contacts 311b which are open under the same condition. When relay coil 311 is energized contacts 311b close and contacts 311a open. The valve controlled by solenoids 312 and 313 is of the so-called "snap-action" type which remains in its actuated position until the opposite solenoid is energized. When the feeding or loading mechanism completes its forward movement, limit switch 314 (FIGS. 22 and 43) is engaged and closed thereby energizing relay coil 311, thereby opening contacts 311a, de-energizing solenoid coil 312 and at the same time closing contacts 311b, thus completing a holding circuit around limit switch 314, and at the same time energizing solenoid coil 313 to return the loader to a position for receiving a new piece of raw material. Thus the loading or feeding mechanism is automatically moved forward when full transfer is completed as determined by limit switch 252 and also as determined by the photoelectric cell circuit, and is automatically returned to its initial position when piston 238 of the pneumatic cylinder 237 completes its forward stroke and limit switch 314 is engaged.

Upon downward movement of ram 31, limit switch 287 is engaged by cam 300 before return movement of slide 57 releases limit switch 252. When limit switch 252 opens, is released, contacts 310a, 310b, and 310c are opened thereby deactivating the photoelectric cell circuit and the feeding or loader circuit, thus requiring that relay coil 306 be energized by some other holding means. When carriage 55 is retracted so that jaws 59 and 60 move away from the work pieces, finally becoming fully retracted so that limit switch 270 is closed, limit switch 288, which is connected in series with limit switch 270 is engaged and closed by cam 301 just before limit switch 287 is opened by the detent 300a in cam 300. This is an important feature in that it provides a positive check on whether the jaws 59 and 60 have been completely retracted because, by such an arrangement, the only circuit available to energize relay coil 306, if limit switch 287 is open, is through limit switches 270 and 288 connected in series. If retraction is not fully complete, the circuit just described will not be completed and thus relay coil 306 will be de-energized to immediately stop the press. During the upward stroke of ram 31, limit switch 270 is opened because the jaws 59 and 60 have been moved inward to a work engaging position and during the upward stroke this portion of the circuit is inactive. The detent 300a portion of a cam 300 has passed limit switch 287 just before limit switch 288 is opened by becoming disengaged with cam 301. This serves to maintain the energizing circuit to relay coil 306 and, as the ram 31 continues downward, the fingers are fully retracted and are returned to "home" position, thereby reengaging limit switch 269 just before the ram reaches its lowermost position. At the bottom of the press stroke, limit switch 287 is again disengaged by cam 300 and thereby opens, as shown in FIG. 40, so that only limit switch 269 maintains a closed circuit to keep relay coil 306 energized. This again is an important feature since it provides a positive check to insure that the jaws are fully retracted and returned to the "home" position because, at the bottom of the stroke of ram 31, switch 269 is the only limit switch maintaining the circuit to relay coil 306. If switch 269 is closed when the slide returns, the press continues in operation and, if for any reason, limit switch 269 is not engaged and closed, the press is immediately stopped.

While the invention has been described in connection with the forms or embodiments illustrated herein, it will be obvious to those skilled in the art that various changes and modifications may be made without departing from the invention and it is to be understood that I intend to cover in the appended claims all such changes and modifications that fall within the true spirit and scope of the invention.

Having thus described my invention, what I claim as new and useful and desire to secure by United States Letters Patent, is:

1. A material handling device for individually and intermittently advancing a plurality of articles seriatim from one position of a series of aligned equally spaced positions to a succeeding position thereof comprising a frame for independent detachable mounting along side said positions, a carriage member mounted on said frame for movement in one direction toward and from said positions, a slide member mounted on said carriage for reciprocatory movement in another direction parallel to the series of positions, a plurality of jaws fixedly positioned on said slide member for engaging the articles to be advanced and moving them from one position to the next, a cyclically operable actuator supported on said frame, and means operatively connecting said actuator with said members for moving said carriage member on said frame to engage the jaws with the articles and thereafter to move said slide member along said carriage member to advance the articles from one position to the next.

2. An automatic transfer mechanism for use in presses having a bed and a reciprocable slide adapted for supporting cooperating die elements at a plurality of stations along a path of work transfer, said transfer mechanism comprising a work engaging jaw, means carrying said jaw for movement relative to said stations in one direction toward and from work engagement and in another direction transverse said one direction for transfer movement of work between said stations, said transfer movement being characterized by periods of acceleration and deceleration, power drive means operatively connected for moving said jaw relative to said stations in both its directions of movement including timing means for determining the timed relation of the movements to one another and to movements of the press slide, supplemental power drive means operatively connected to drive said jaw during its transfer movement, and control means connected to said supplemental drive means to render it effective for aiding said power means during at least a part of the transfer movement wherein acceleration is taking place.

3. An automatic transfer mechanism as set forth in claim 2 wherein said power drive means includes driving cam means providing power for said transfer movement and controlling the timing thereof, and driven cam follower means operatively connected to move said jaw for transfer, said supplemental drive means being operatively connected to said follower means.

4. An automatic transfer mechanism as set forth in claim 3 wherein said supplemental drive means includes fluid pressure operated means connected to said follower means.

5. An automatic transfer mechanism as set forth in claim 4 wherein said control means includes valve means connected for controlling the direction of operation of said fluid pressure operated means and valve controlling cam means driven in synchronism with said driving cam means.

6. The material handling device of claim 1 wherein said connecting means comprises a multiplying linkage for augmenting the movements produced by said actuator including a pair of spaced, parallel racks, one of which is secured to one of said members and the other of which is secured to the other of said members, a pinion lying between and meshing with both of said racks, and means connecting said pinion with said actuator for movement thereby to cause amplified relative movement between said members.

7. The material-handling device of claim 1 wherein said connecting means comprises a lead screw and nut device for moving said members.

8. The material-handling device of claim 1 wherein said connecting means comprises a recirculating ball device for moving said members.

9. The device of claim 1 wherein said connecting means includes first and second shafts having first and second universal joints connected thereto, and a member extendible along the longitudinal axis of said member and having the end portions thereof connected to said first and second universal joints.

10. The material handling device of claim 1 wherein said connecting means comprises a motion amplification device including a pair of spaced, parallel racks, the first of said racks being secured to one of said members and the second of said racks being secured to the other of said members, a first pinion in mesh with the first of said racks, a second pinion in mesh with the second of said racks, and means including a common axle carrying both of said pinions connecting said pinions with said actuator for movement thereby to cause amplified relative movement between said members.

11. A transfer unit for mounting in a press having a reciprocable slide and a bed, supporting cooperating die sets at a plurality of workpiece forming stations for sequential forming operations, said unit comprising a base for detachable mounting of the unit as a whole to the press bed adjacent to but independent of said sets, a workpiece engaging jaw for each station, means carrying each jaw on said base for movement from a retracted position toward the respective station into engagement with a workpiece and between adjacent stations for transfer movement of workpieces from station to station, a driving connection for said unit adapted for direct attachment to and reciprocation with the press slide, actuating means driven by said connection for control of jaw movement including adjustable means for obtaining a predetermined movement of the actuating means irrespective of the magnitude of movement of said connection by the slide stroke whereby the unit is readily adaptable to presses of different strokes, and further adjustment means in said actuating means independently adjustable for determining the length of transfer movement in response to reciprocation of the driving connection whereby different relative spacings between stations can be readily accommodated.

12. A transfer unit for mounting on a press having a reciprocable slide and a bed supporting cooperating die sets at a plurality of workpiece forming stations for sequential forming operations, said unit comprising a base for detachable mounting of the unit as a whole to the press bed adjacent to but independent of said die sets, a workpiece engaging jaw for each of said stations, means carrying said jaws on said base for movement toward the respective stations into engagement with a workpiece and between stations for transfer movement of workpieces from station to station, a driving connection for said unit comprising an actuating member mounted for rocking movement on said base and a crank arm pivotally connected to said actuating member and adapted for pivotal connection directly to the press slide to be operated thereby, jaw actuating means to and driven by said connection for control of jaw movement including adjustable means for obtaining the same predetermined movement of the actuating means irrespective of the magnitude of movement of said connector by the slide stroke whereby the unit is readily adaptable to presses of different strokes, drive means between said actuating means and said jaws for workpiece transfer, and adjustment means in said drive means for controlling the length of transfer movement in response to the predetermined movement of said actuating means whereby different relative spacings between stations can be readily accommodated.

13. An automatic transfer mechanism for use in presses having a reciprocable slide and a bed adapted for supporting cooperating die components, said transfer mechanism comprising a workpiece engaging jaw, means carrying said jaw for movement in one direction from a retracted position toward the station into engagement with a workpiece and transverse said one direction for transfer movement of a workpiece and return, drive means adapted for direct mechanical connection to the press slide and operatively connected to move said jaw in its transfer and return movement providing dwell periods at one extreme while the jaw moves forward to engage a workpiece and at the other extreme while the jaw retracts, said drive means including cam means driven in timed relation with said slide movement, means operatively connected to said cam means including means oscillatable about a pivot axis, a driving connection for transfer and return movement connected to said oscillatable means at a point radially displaced from the pivot axis, and manual means for adjustably setting the radial position of said driving connection for controlling the amount of transfer movement in response to movement of said cam means.

14. The combination comprising a press having a reciprocable element and a bed portion for performing sequential forming operations on workpieces at a plurality of work stations along said bed portion, transfer means including a work engaging member movable in at least two directions for automatically advancing workpieces from one work station to the next work station, power drive means for driving said member and synchronizing movements of said member with movements of said element, supplemental power drive means operatively connected for moving said work engaging member during workpiece advance, control means for rendering said supplemental drive means effective at least during a portion of said advance movement wherein acceleration is taking place, and condition responsive means for causing continued movement of said element when said element and said member are in a predetermined positional relation and for arresting movement of said element when said element and said member are in another positional relationship.

15. The combination comprising a press having a reciprocable element and a bed portion for performing sequential forming operations on workpieces at a plurality of work stations along said bed portion, transfer means including a work engaging member movable in at least two directions for automatically advancing workpieces from one work station to the next work station, drive means for causing motion of said member in a direction to release a workpiece upon completion of a transfer operation and at a predetermined position of said element during its working stroke, drive means for arresting said motion and thereafter causing motion of said member in a second direction to return the work engaging member to a position for subsequent transfer operations, supplemental power drive means operatively connected for moving said member during transfer, control means for rendering said supplemental drive means effective during at least a portion of the advance movement of said member, means for sensing said predetermined position of said element and for producing a signal when said element is at such predetermined position, means for sensing the position of said work engaging upon completion of said release motion and for producing a signal when said member has completed its motion in a release direction, and means for causing continued movement of said element in response to the presence of signals from both of said sensing means and for arresting movement of said element in response to a lack of one or more of such signals.

16. The combination comprising a press having a reciprocable element and a bed portion for performing sequential forming operations on workpieces at a plurality of work stations along said bed portion, transfer means including a work engaging member movable in at least two directions for automatically advancing workpieces from one work station to the next work station, position sensing means for producing a signal when said element is at a predetermined position during its return stroke, second position sensing means for producing a signal when said work engaging member is in a proper position to begin its work engaging movement, means including photocells for sensing the presence of a properly aligned workpiece at at least one of said work stations and for producing a signal in the absence of such properly aligned workpiece, and means connected to receive signals from said sensing means for continuing operation of the press only in response to signals from the first and second position sensing means and for discontinuing operation under other conditions of operation.

17. The combination comprising a press having a reciprocable element and a bed portion for performing sequential forming operations on workpieces at a plurality of work stations along said bed portion, transfer means including a work engaging member movable in at least two directions for automatically advancing workpieces from one work station to a succeeding work station, means for sensing the presence of a properly aligned workpiece at at least one of said work stations and for producing a signal in the absence of such properly aligned workpiece, and means for discontinuing operation of the press in response to such signal.

18. The combination of claim 17 wherein said sensing means includes opposed pairs of photocells at each of said work stations, said photocells being adjustably secured to and supported by members disposed beside the bed of the press whereby said photocells may be adjustably positioned to care for variable spacing between work stations.

19. The combination comprising a press having a bed portion for performing sequential forming operations on workpieces at a plurality of successive stations along said bed portion, loading means for automatically advancing material to be formed to a loading station, transfer means including a reciprocable element for automatically advancing said material from said loading station to the first of said work stations and for advancing workpieces from one work station to the next work station in synchronism with movements of the press, means responsive to a position of said element for initiating operation of the loading means whereby said material is caused to move to said loading station, means for sensing the presence of a properly aligned workpiece at at least one of said work stations and for producing a signal in the absence of a properly aligned workpiece, and means for discontinuing the operation of the press in response to such signal.

20. The combination comprising a press having a bed portion for performing a sequential forming operations on workpieces at at least two successive work stations along said bed portion, loading means including a first reciprocable element for automatically advancing material to be formed to a loading station, transfer means including a second reciprocable element for automatically advancing said material from said loading station to the first of said work stations and for advancing workpieces from one work station to the next work station in synchronism with movements of the press, first electrical means for signalling when said second element is at a first position, means for sensing the presence of a properly aligned workpiece at at least one of said work stations and for producing a signal in the absence of such aligned workpiece, means for discontinuing operation of the press in response to such absence signal, second electrical means for signalling when said second element is at a second position, and means for causing the first reciprocable element to advance to said loading position in response to a signal of said first electrical means and to retract said first element in response to a signal of the second electrical means.

21. An automatic transfer mechanism for use in presses having a bed and a reciprocable slide adapted for supporting cooperating die elements at a working station, said transfer mechanism comprising a base for detachable mounting on the bed, a work engaging jaw, means on said base carrying said jaw for movement along the bed of the press in one direction toward and from work engagement and in another direction transverse said one direction for forward transfer movement of the work and return, and drive means on said base operatively connected for moving said jaw relative to the working station in both its directions of movement, said drive means including an element for detachable connection directly to the slide of the press for actuating said jaw during movement of the slide, said drive means also including means for delaying forward transfer movement of the jaw during initial movement of the press slide upward from the bed and then completing forward transfer during continued upward slide movement comprising first and second cam means operatively connected with said element and adapted to be given a predetermined movement thereby on each stroke of the slide, means operated by said first cam means connected for moving said jaw in one direction, and additional means operated by said second cam means connected for moving said jaw in said other direction, said base being formed to extend alongside said die elements while clearing the die elements, said base, jaw, jaw carrying and drive means constituting a readily removable unitary device, which can be secured in the press adjacent the working station independently of the die elements.

22. An automatic transfer mechanism for use in presses having a bed and a reciprocable slide adapted for supporting cooperating die elements at a working station, said transfer mechanism comprising a base for detachable mounting on the bed, a work engaging jaw, means on said base carrying said jaw for movement along the bed of the press in one direction toward and from work engagement and in another direction transverse said one direction for forward transfer movement of the work and return, and drive means on said base operatively connected for moving said jaw relative to the working station in both its directions of movement, said drive means including an element for detachable connection directly to the slide of the press for actuating said jaw during movement of the slide, said drive means also including means for delaying forward transfer movement of the jaw during initial movement of the press slide upward from the bed and then completing forward transfer during continued upward slide movement comprising first and second cam means operatively connected with said element and adapted to be given a predetermined movement thereby on each stroke of the slide, means operated by said first cam means connected for moving said jaw in one direction, additional means operated by said second cam means connected for moving said jaw in said other direction and adjustable means between said second cam means and said jaw for adjusting the extent of movement of said jaw in said other direction upon each stroke of the slide, said base being formed to extend alongside said die elements while clearing the die elements, said base, jaw, jaw carrying and drive means constituting a removable unitary device which can be readily secured in the press adjacent the working station independently of the die elements.

23. An automatic transfer mechanism for presses having a bed and a reciprocable slide adapted for supporting cooperating die elements at a working station, said transfer mechanism comprising a base, a work engaging jaw, means on said base carrying said jaw for movement along the bed of the press in one direction toward and from work engagement and in another direction transverse said one direction for forward transfer movement of the work and return, drive means on said base operatively connected for moving said jaw relative to the working station in both its directions of movement, said drive means including an element for detachable connection directly to the slide of the press for actuating said jaw during movement of the slide, said drive means also including means for delaying forward transfer movement of the jaw during initial movement of the press slide upward from the bed and then completing forward transfer during continued upward slide movement, said base having a length to extend along the transfer direction and being of limited width for independent mounting alongside said die elements while clearing the die elements and their supporting structure, means for detachably mounting said base on the press bed, means for detachably connecting said element to the press slide, said base, jaw, jaw carrying and drive means constituting a unitary device whose sole connection to the press is through said detachable mounting and connecting means so the unit can be readily detachably secured to the press adjacent the working station and removed independently of the die elements.

24. An automatic transfer mechanism for use in presses having a bed and a reciprocable slide adapted for supporting cooperating die elements at a plurality of die stations along the bed, said transfer mechanism comprising a base for detachable mounting on the bed of the press adjacent the die positions, a work engaging jaw carried on said base for movement from a retracted position toward the die elements to engage a workpiece and in the transverse direction for transfer to move the work from one station to the next on successive strokes of the press, and drive means on said base for moving said jaw in synchronism with the movement of the slide and to hold said jaw retracted during the initial portion of the upward slide movement until the workpiece is clear for transfer, said drive means including an actuating member mounted for rocking movement on said base, and a crank pivotally connected to said actuating member and adapted for attachment directly to the slide of the press to provide the sole driving and timing connection between the press and transfer mechanism, said base being formed to extend alongside said die elements while clearing the die elements, said base, jaw, and drive means constituting a readily removable unitary device which can be readily secured in the press adjacent the die stations independently thereof.

25. An automatic transfer mechanism for presses having a bed and reciprocable slide adapted for supporting cooperating die elements at a working station, said transfer mechanism comprising a pair of similar complimentary transfer units for location on opposite sides of the transfer path, each of said units comprising a base, a work engaging jaw, means on said base carrying said jaw for movement in one direction toward and from the jaw of the other unit to engage the work and in another direction transverse said one direction for forward transfer movement of the work and return, drive means on said base operatively connected for moving said jaw relative to the working station in both its directions of movement, said drive means including an element, one for each unit, for detachable connection directly to the slide of the press for actuating the jaws of the different units during movement of the slide, said drive means of each unit also including means for delaying forward transfer movement of the jaw during initial movements of the press slide upward from the bed and then completing forward transfer during continued upward slide movement, means for independently detachably mounting said bases on the press bed, crank means for detachably connecting the said elements of said units to the press slide, said base, jaw, jaw carrying and drive means of each unit constituting a unitary device whose sole connection to the press is through said detachable mounting and connecting means so that each transfer unit can be readily detachably secured to the press adjacent to the working station and removed independently of the die elements.

References Cited in the file of this patent

UNITED STATES PATENTS

| | | |
|---|---|---|
| 736,265 | Jinks et al. | Aug. 11, 1903 |
| 1,285,104 | Frahm | Nov. 19, 1918 |
| 1,577,627 | Webster | Mar. 23, 1926 |
| 2,074,680 | Wilcox | Mar. 23, 1937 |
| 2,124,113 | Kaufman | July 19, 1938 |
| 2,132,244 | Richard | Oct. 4, 1938 |
| 2,382,339 | Skowron et al. | Aug. 14, 1945 |
| 2,494,137 | Martines | Jan. 10, 1950 |
| 2,642,179 | Cross | Mar. 23, 1953 |
| 2,736,909 | Hatebur | Mar. 6, 1956 |